(12) United States Patent
Schinkel et al.

(10) Patent No.: US 12,312,217 B2
(45) Date of Patent: May 27, 2025

(54) (HEAVE) BALANCING DEVICE, HOISTING SYSTEM, METHOD FOR HOISTING AND KIT OF PARTS FOR SPRING BALANCING A HOISTING SYSTEM

(71) Applicants: NHLO Holding B.V., Utrecht (NL); Edouard Frans Alexander Schinkel, Utrecht (NL); Michaël Hubert Schinkel, Utrecht (NL)

(72) Inventors: Edouard Frans Alexander Schinkel, Utrecht (NL); Michaël Hubert Schinkel, Utrecht (NL); Bart Walgaard, The Hague (NL); Gjalt Lindeboom, Amsterdam (NL); Eelke Gerrit De Vries, The Hague (NL)

(73) Assignee: NHLO Holding B.V., Utrecht (NL)

( * ) Notice: Subject to any disclaimer, the term of this patent is extended or adjusted under 35 U.S.C. 154(b) by 912 days.

(21) Appl. No.: 17/293,160

(22) PCT Filed: Nov. 13, 2019

(86) PCT No.: PCT/EP2019/081243
§ 371 (c)(1),
(2) Date: May 12, 2021

(87) PCT Pub. No.: WO2020/099520
PCT Pub. Date: May 22, 2020

(65) Prior Publication Data
US 2021/0403293 A1    Dec. 30, 2021

(30) Foreign Application Priority Data

Nov. 13, 2018    (EP) ..................... 18206051

(51) Int. Cl.
*B66C 13/06*    (2006.01)
*B66C 1/10*    (2006.01)
(Continued)

(52) U.S. Cl.
CPC ............... *B66C 13/06* (2013.01); *B66C 1/10* (2013.01); *B66C 13/12* (2013.01); *B66C 23/52* (2013.01); *F16F 9/512* (2013.01)

(58) Field of Classification Search
CPC ........... B66C 13/06; B66C 13/12; B66C 1/10; B66C 23/52; F16F 9/512
(Continued)

(56) References Cited

U.S. PATENT DOCUMENTS 1,609,900 A * 12/1926 Burke .................... B60D 1/182
267/70
1,643,588 A * 9/1927 Ratigan .................... E21B 1/02
294/81.5
(Continued)

FOREIGN PATENT DOCUMENTS

DE    3816023 A1    11/1989
EP    2896589 A1    7/2015
(Continued)

OTHER PUBLICATIONS

Machine translation (Year: 2024).*
(Continued)

*Primary Examiner* — Bradley T King
(74) *Attorney, Agent, or Firm* — David P. Owen; HOYNG ROKH MONEGIER B.V.

(57) ABSTRACT

Heave balance device (1) can balance a lifted or supported load (8). The load can be lifted by a hoisting device (10) or it can be supported. The heave balance device comprises a first frame (2) and a connection unit (22) that can be suspended, e.g. to a hoisting device. Further a moveable carrying unit (32) allows for carrying (suspending or supporting) a load. The device comprises a transmission that couples the connection unit and carrying unit, wherein said transmission is arranged to guide the connection unit and the
(Continued)

carrying unit to move along a guideline with respect to each other, the transmission having a spring force balancing arrangement (4) with one or more leverage units, such as one or more pivoting arms (50, 51), and with one or more configurable (gas- or) hydropneumatic springs. A method comprises suspending the load via a (heave) balance device. Further a kit of parts for hoisting devices is provided to allow load decoupling.

16 Claims, 11 Drawing Sheets

(51) Int. Cl.
 *B66C 13/12* (2006.01)
 *B66C 23/52* (2006.01)
 *F16F 9/512* (2006.01)
(58) Field of Classification Search
 USPC .......................................................... 267/70
 See application file for complete search history.

(56) References Cited

U.S. PATENT DOCUMENTS

| | | | | |
|---|---|---|---|---|
| 2,421,822 | A * | 6/1947 | Wood | F16L 3/18 |
| | | | | 248/562 |
| 3,357,694 | A * | 12/1967 | Kidder | H02G 7/14 |
| | | | | 174/42 |
| 3,552,695 | A * | 1/1971 | Liesegang | F16L 3/2053 |
| | | | | 248/589 |
| 3,643,934 | A | 2/1972 | Bordes | |
| 3,791,628 | A | 2/1974 | Burns et al. | |
| 3,894,476 | A | 7/1975 | Cobb | |
| 3,895,788 | A * | 7/1975 | Liesegang | F16L 3/2056 |
| | | | | 267/70 |
| 4,274,761 | A * | 6/1981 | Boguth | E02D 7/18 |
| | | | | 267/141.1 |
| 5,022,543 | A | 6/1991 | Versteeg | |
| 5,846,028 | A * | 12/1998 | Thory | E21B 19/006 |
| | | | | 166/359 |
| 6,668,747 | B2 * | 12/2003 | Kjerstad | B66C 23/52 |
| | | | | 114/264 |
| 8,051,731 | B2 * | 11/2011 | Hachuda | F16H 21/44 |
| | | | | 248/575 |
| 11,111,113 | B2 * | 9/2021 | Martinsen | B66C 13/04 |
| 2005/0167117 | A1 | 8/2005 | Webster et al. | |
| 2006/0016605 | A1 * | 1/2006 | Coles | E21B 19/09 |
| | | | | 166/355 |
| 2007/0003375 | A1 * | 1/2007 | Knutsen | B63B 39/02 |
| | | | | 405/224 |
| 2013/0334157 | A1 * | 12/2013 | Lappalainen | B66C 13/06 |
| | | | | 212/273 |
| 2015/0166309 | A1 | 6/2015 | Tuenkers | |
| 2015/0336775 | A1 * | 11/2015 | Ruivenkamp | B66C 1/66 |
| | | | | 414/139.6 |
| 2017/0254384 | A1 * | 9/2017 | Amaudric Du Chaffaut | |
| | | | | E21B 19/006 |
| 2019/0047829 | A1 * | 2/2019 | Martinsen | B66C 13/02 |
| 2019/0337772 | A1 * | 11/2019 | Roodenburg | B66D 1/52 |
| 2020/0115196 | A1 * | 4/2020 | Stehr | B66F 7/0616 |
| 2022/0041409 | A1 * | 2/2022 | Hooftman | F16B 2/06 |

FOREIGN PATENT DOCUMENTS

| | | | |
|---|---|---|---|
| EP | 2935971 A1 | 10/2015 | |
| EP | 3336041 A1 | 6/2018 | |
| GB | 1476671 A | 6/1977 | |
| GB | 2554902 A | 4/2018 | |
| JP | 85241348 A | 3/1977 | |
| KR | 20120035432 A | 4/2021 | |
| NO | 20160909 A1 | 11/2017 | |
| WO | 9515912 A1 | 6/1995 | |
| WO | 2007145503 A1 | 12/2007 | |
| WO | 2009112151 A2 | 9/2009 | |
| WO | WO-2020077910 A1 * | 4/2020 | E21B 19/09 |

OTHER PUBLICATIONS

Quaglia Giuseppe; Yin Zhe, "Static balancing of planar articulated robots", Frontiers of Mechanical Engineering, Higher Education Press, Heidelberg, Heidelberg, (Sep. 11, 2015), vol. 10, No. 4.
Patrice Lambert et al, "An Adjustable Constant Force Mechanism Using Pin Joints and Springs", Patrice Lambert et al, P. Lambert, J.L. Herder et al, New Trends in Mechanism and Machine Science, Mechanisms and Machine Science 43, Springer International, (2017), pp. 453-461.
Chapter 2 An Overview of Balancing Methods, V. Arakelian, S. Briot, Balancing of Linkages and Robot Manipulators, Mechanisms and Machine Science 27, Springer International, (2015), pp. 7-51.

* cited by examiner

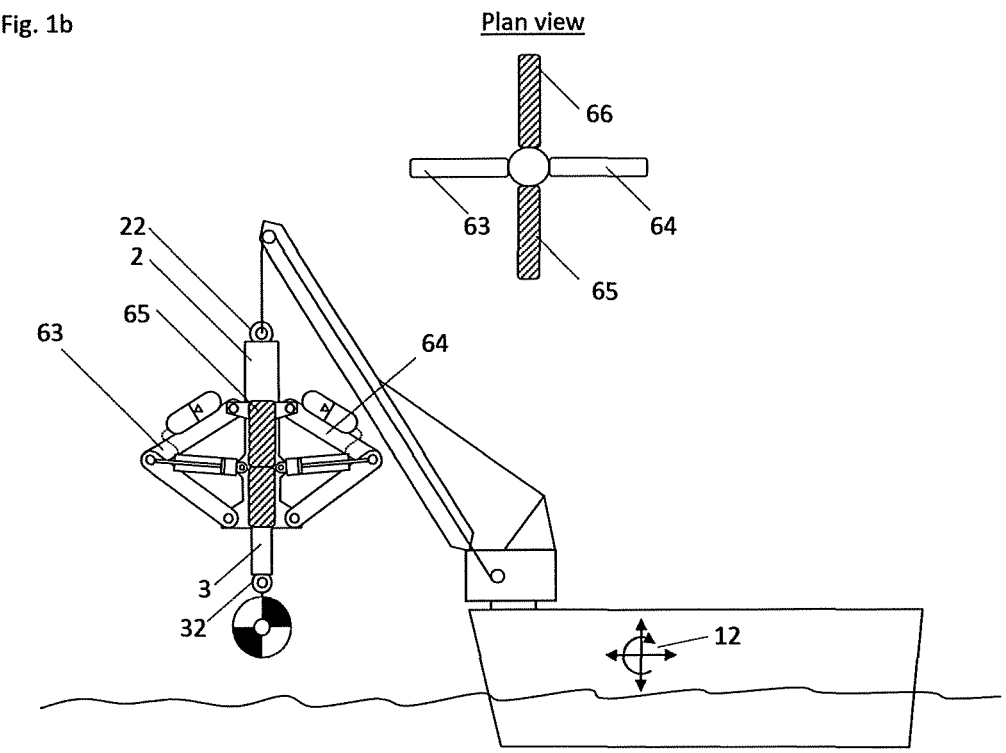
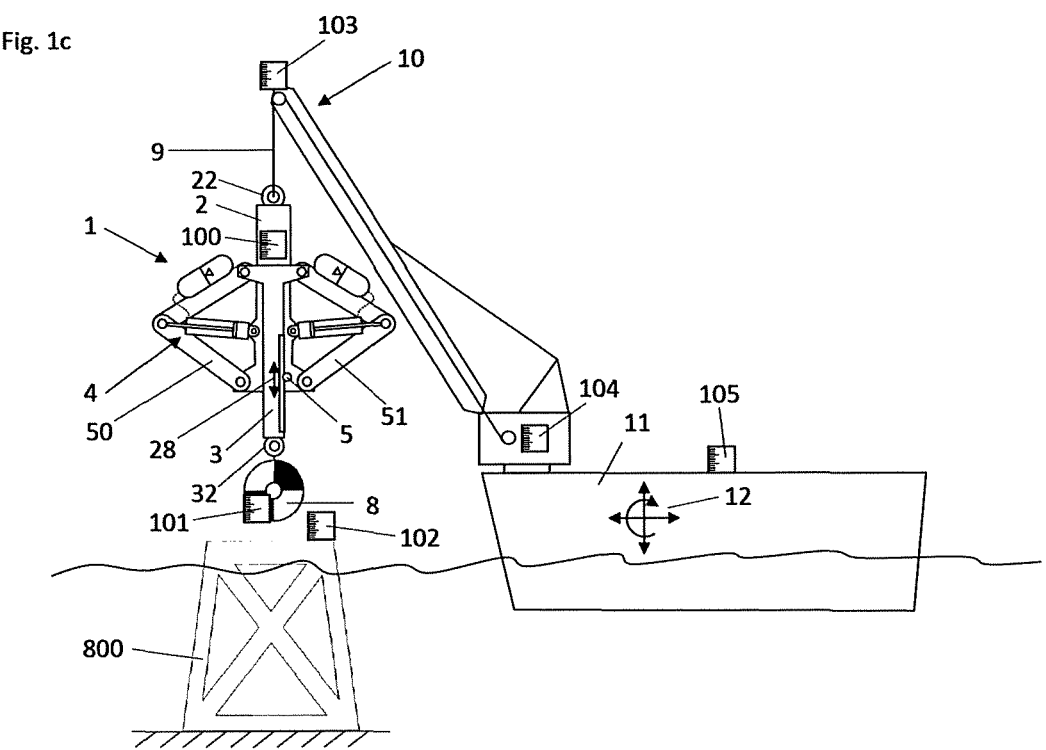

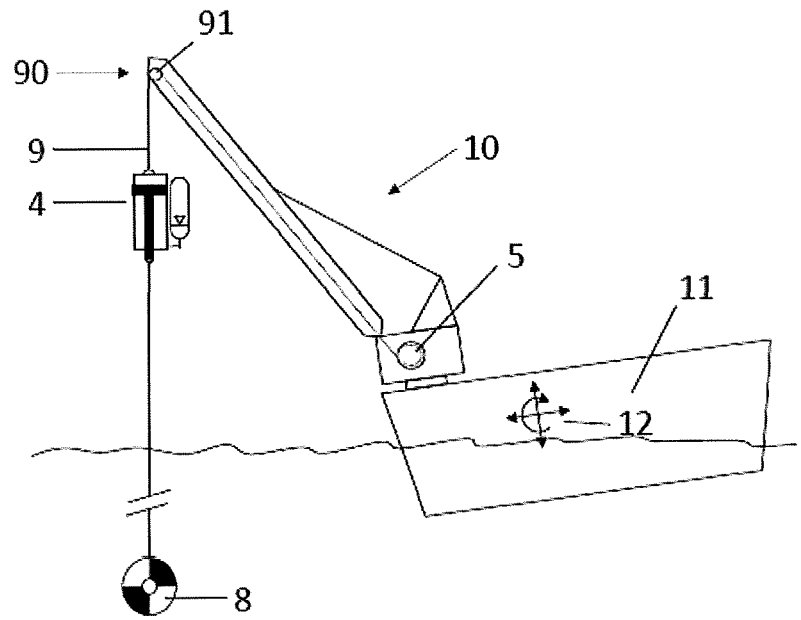
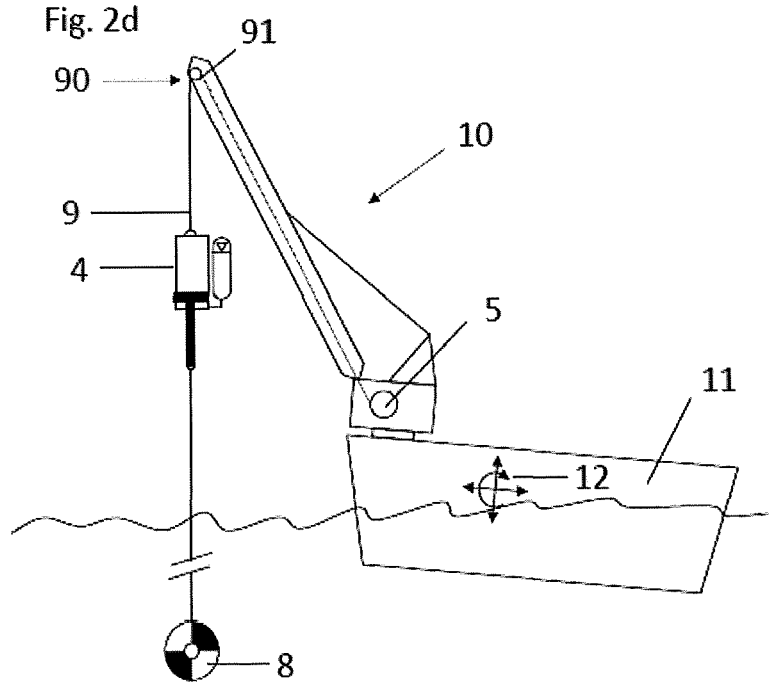

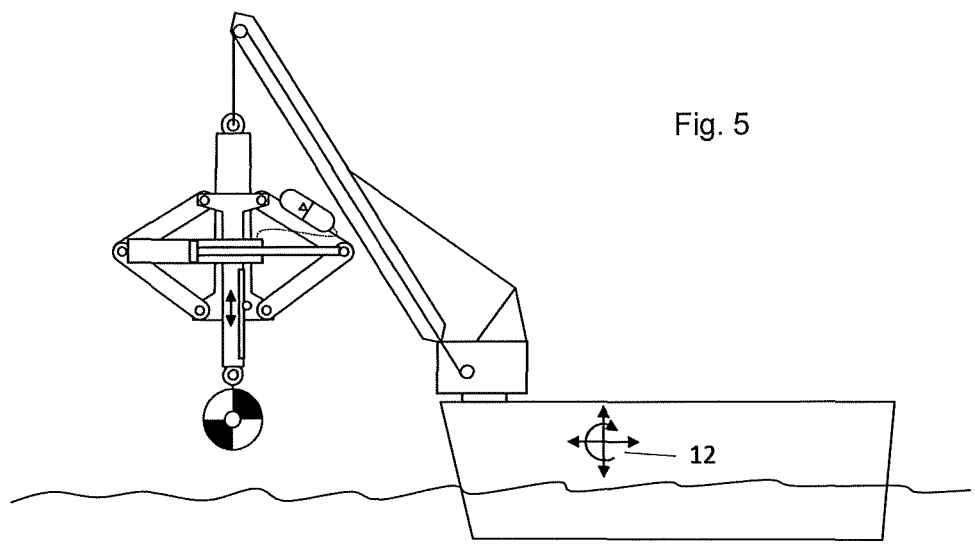
Fig. 5
Fig. 6a
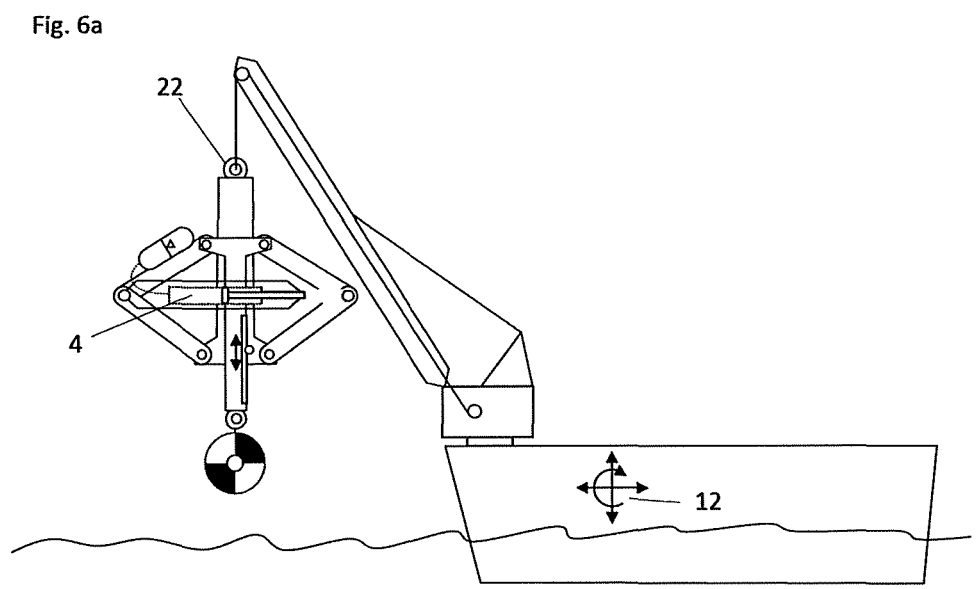

(HEAVE) BALANCING DEVICE, HOISTING SYSTEM, METHOD FOR HOISTING AND KIT OF PARTS FOR SPRING BALANCING A HOISTING SYSTEM

The invention relates to balancing a load, preferably during heaving. The invention relates to balancing device for balancing a load, preferably a heave balancing device for balancing the load lifted by a hoisting device. The invention further relates to a hoisting system, preferably a spring balanced hoisting system comprising a non-spring balanced hoisting device. The invention also relates to a method of spring balanced hoisting. A further subject of the invention relates to a kit of parts for providing a hoisting device with a spring balanced hoisting capabilities.

(Gas- or) hydro-pneumatic springs are known. (Gas- or) hydro-pneumatic springs can be configured. A (gas- or) hydro-pneumatic spring can comprise a configuration set up to increase or reduce the filling amount of the pneumatic spring, thereby configuring the pneumatic spring and adapting its spring behavior. However, (gas- or) hydro-pneumatic springs do not behave according to Hook's law. Passive spring-balanced systems generally use leaf springs that behave according to Hook's law.

In the prior art, especially prior art relating to off-shore applications, springs have been used to decouple a vertical movement of the load from the hoisting device, which could be a crane on a ship. In prior art such as EP2896589 and EP3336041, a spring is coupled linearly to the load so that the spring force on the load increases and decreases at different extensions of the spring, unless an unlimited gas volume is engaged. With smaller, feasible gas volumes only limited decoupling can be provided.

GB2554902 discloses an active heave compensation apparatus having a scissor, parallelogram linkage. In all disclosed embodiments, a signal from accelerometers in an MRU or motion response unit is used to control the movement of travelling beams, either towards each other or apart. The movement in the beam plane is converted to movement of a scissor means. In GB2554902, as a result of the lack of any spring force balancing, leverage units or pivoting arms, the heave apparatus is continuously adapting in response to active commands. This requires a lot of power and big actuators to provide the required force.

FIGS. 2a and 2b show a ship 11 with hoisting device 10. The ship 11 is an example of a system experiencing heaving motions due to the influence of waves. In operation the ship system can heave 12. Heave or heaving motions are along the vertical axis or Z-direction. Motions in other directions (along X and Y axis) such as swaying and/or surging, and rotations such as rolling and/or pitching, swaying and/or surging, can also contribute to the heaving motions 12. When hoisting a load 8 by direct coupling of the load to the hoisting device 10, the heaving of the ship 11 would result in the load moving. A hoisting line 9 carries a load 8. In order to keep the load 8 at a steady vertical position while the ship 11 heaves or rocks (generally indicated by arrows 12), the length of the hoisting line 9 is varied using the actuator 5 at the cost of a lot of energy.

FIGS. 2c and 2d show a hydro-pneumatic (extension) spring 4 coupled linearly to a load 8 between a tip 90 of crane pulley 91 and the load. When the ship 11 heaves 12, the distance between the tip 90 of the crane pulley and the load 8 may change due to the spring, providing some decoupling of the vertical motions of the load from the vertical movements of the ship. When the crane pulley moves down as shown in FIG. 2c the spring detracts, applying a decreasing upward force on the load. When crane pulley moves up, as shown in FIG. 2d, the spring is extended, applying an increasing upward force on the load. The variable upward force on the load 8 combined with irregular heaving of the ship will result in movements of the load. Therefore, a spring linearly connected with the load can only provide a limited degree of decoupling of the load 8 in case of vertical movement of the crane pulley in theoretical conditions with regular movements, and instead, in realistic conditions with irregular movements, the variable upward forces on the load by the spring may result in fast and dangerous motions of the load. A linearly connected spring is considered a spring mounted generally parallel to the gravity force. Generally, if the hoisting device 10 is not moving, a linearly connected spring will suspend the load and stabilize the load in one vertical position, the stabilized position. When the load is not in that position the spring will induce a force on the load in the direction of the stabilized position. If the hoisting device moves, e.g. by heaving motions of a ship, the load is decoupled somewhat.

An object of the invention is to add decoupling, in particular improved decoupling, to existing non-decoupled cranes. A further goal is to improve such decoupling.

According to an aspect, a heave balancing device is provided. The heave balancing device comprises a first frame and a connection unit. The connection unit allows a connection to a supporting device that can e.g. lift loads, such as a hoisting device. As a load will be lifted via the heave balancing system, the connection unit will connect to the supporting device for provide a lifting force, e.g. a suspension force. Preferably, the connection unit can be arranged to allow suspending the heave balance device under a hoisting device, e.g. via a hoisting line.

In embodiments, the connection unit allows connecting the heave balancing device to a heaving system, e.g. a ship on which the hoisting device is placed. In other embodiments the connection unit allows positioning the heave balancing device in a heaving system, e.g. a hoisting device mounted on a seabed for transferring a load onto a heaving ship. The hoisting device can be a crane hook. In other embodiments, the connection unit can be supported by, e.g. directly attached to, the deck of the ship. This connection unit can be a ring that is an integral part of the first frame.

The crane can move as a result of the heaving ship or the crane tip moves as a result of actuation of the crane itself. Other devices that can lift loads can be a support frame mounted on the deck of the ship. Also guides, tub- or towlines can be used. In embodiments, dynamic positioning systems, pitch and roll compensation systems can be used for the ship or crane or other lifting devices. Some embodiments use a (two domains of freedom compensated) gripper. Any of these systems can be combined with all or some embodiments of the invention. Further compensation systems for movements in the XY plane can be combined with all or some embodiments of the invention. In the below a lifting device or crane can be any of these systems.

The heave balancing device further comprises a load carrying unit, e.g. a further ring. The load carrying unit can also be a carrying platform or a further hoist line or hoist line connection point. The load carrying unit is preferably arranged to carry, e.g. by suspending or supporting, a load of 10.000 kg or 20.000 kg, preferably more than 30.000 kg or 50.000 kg, and more preferably more than 100.000 kg or 250.000 kg. The combination of connection unit and carrying unit allows to hoist the heave balancing device by existing hoisting devices and pick up and drop off loads while in operation.

Preferably the heave balancing device is arranged to transfer a suspension force for a load from one side to another side of the heave balancing device. This allows positioning the heave balancing system in an existing force transfer system that supports a load, e.g. replacing a part of a hoist line or replace an existing support that is not decoupled or not fully decoupled. The connection unit and the carrying unit are arranged to allow such force transferring to opposite sides. In particular, this allows positioning the heave balancing device in between the load and whatever is supporting the load. The heave balancing device, and specifically the carrying unit and connection unit are arranged to be sandwiched between load and support.

Preferably a transmission couples the connection unit and carrying unit. The transmission allows the connection unit to move with respect to the carrying unit. This will allow the desired decoupling. The transmission is arranged to guide the connection unit and the carrying unit to move along a (virtual of physical) guideline with respect to each other. In operation the guideline is generally along the direction of gravity. The transmission comprises a spring force balancing arrangement. In a spring force balancing arrangement, In a spring force balancing arrangement, the increase or decrease of the spring force is generally matched with a (reciprocal) deflection, so that the resultant force on the load remains generally constant at different extensions of the spring. This allows decoupling, preferably complete decoupling. However, the invention is not limited to 100% spring-balanced decoupling. A significant decoupling, e.g. of at least 40% of the weight, preferably at least 50%, more preferably at least 60%, and even more preferably at least 80% decoupling of the weight. As such the spring does not have to be a (perfect) linear spring. Additional decoupling can be provided by an actuator.

In embodiments the spring force balancing arrangement is arranged to be configured to provide a balancing force at multiple positions of extension of the spring. Preferably the significant decoupling is provided, preferably continuously, over at least 40-60% of the spring extension, preferably starting at at least 30% or more preferably at at least 20% spring extension, and preferably up to at least 70%, or more preferably up to at least 80% of the spring extension.

Preferably the spring force balancing arrangement comprise one or more leverage units, such as one or more pivoting arms, and one or more configurable (gas- or) hydro-pneumatic springs, hereinafter 'pneumatic spring'. Pneumatic springs are particularly suitable for masses over 10 k kg and can quickly be configured to provide spring balancing adapted to the actual load. In use the spring force balancing arrangement is arranged such that the pneumatic spring transfers a force onto the carrying unit in an upward direction. Basically, the force needed to bring about a certain change of the length of the spring will increase with the extension of the spring.

Gas- or hydro-pneumatic springs generally comprise two chambers and a piston. The air or oil pressure in the chambers effects the pressure on the piston. At least one of the chambers will have a relatively high pressure (up to 300 bar or even 600 bar at maximum compression) and may be connected to a hydraulic accumulator. The pressure of that chamber may be configurable. The other chamber on the other side of the piston may be under limited pressure, for example having a pressure of 1-10 bar at minimum compression.

Examples of leveraging units comprise a unit to change an angle of force application by the pneumatic spring, an arm or arm assembly that leverages a spring force, a lever (arm with two engagement points each having a pivoting point) or a rotating element. Embodiments will be disclosed. The invention is not limited to the illustrated leverage units. In embodiments the leverage unit is pivoting or rotating mechanical structure, which substantially counteracts an increasing/decreasing force of a spring, in such a way this results in a substantially constant (upward) force delivered by the spring, enabled to be coupled to an opposite (downward and substantially constant) force on a load such as gravity.

The leverage unit according to the invention provides a conversion of the increasing/decreasing spring force that generally equalizes the force exerted by the pneumatic spring at generally all ranges of extension of the pneumatic spring. Preferably the transmission, more preferably the leverage unit, provides for a force transmission that is not parallel to the guideline. The force is diverted outside the guideline pathway. Preferably the leverage unit is mounted pivotable. Preferably the transmission unit and more preferably the leverage unit provide for a rotational movement of the spring when the spring extends or contracts, so that the orientation of the spring compared to the guideline changes when the spring extends or contracts.

A heave balancing device according to the invention, e.g. according to claim 1, allows a significant increase of decoupling compared to prior art, if not full decoupling. The decoupling is, in operation, in the z-direction. Further such a heave balancing device, especially ones that divert forces outside of the path of the guideline, e.g. via a pivoting arm, can be compact because of a significant reduction in gas volume of the used (gas- or) hydro-pneumatic springs and of actuator power compared to prior art. As a result of using a leverage unit, the (gas- or) hydro-pneumatic springs, the actuators and the power supplies that are used can be smaller and cheaper. Importantly, the reduction in size and weight allows for engaging the device below the hook of an existing crane. It allows to be used in existing hoisting devices that do not have decoupling capabilities. Undesired movements in the x and y directions can be reduced using tug lines, physical guides, etc.

In most embodiments, the first frame or the transmission guides the carrying unit with respect to the connection unit. In embodiments, the first frame that holds the connection unit, will extend to a position (and thereby have a suspension point) closer to the load then parts of the carrying unit. This results in a compact arrangement. In operation, suspension forces are guided in a direction opposite to the gravity direction.

In embodiments the pneumatic spring is arranged non-linear in the spring force balancing arrangement, that is the pneumatic spring is arranged non-parallel to the guideline. The leverage unit can allow the non-linear arrangement of the pneumatic spring.

Preferably the leverage unit neutralizes the changed force exerted by the pneumatic spring, resulting in the upward force exerted on the carrying unit remaining generally constant over the motion range of the transmission.

In embodiments, the pneumatic spring is pivotably connected to the spring force balancing arrangement. The pivot point forms the leverage unit. In embodiments the pivot point allows a change of a direction of the spring force and thereby leverages the suspension force exerted by the pneumatic spring on the load.

In embodiments, the leverage unit provides the opposite leverage and is arranged such that the leveraged force of the spring is generally constant at the load carrying unit. I.e., when the balance heaving device is in a configuration where a large amount of force is needed to bring about a certain change in spring length, the leveraging unit is arranged in such a way that a certain change in spring length results in a large amount of displacement between the connection unit and the load carrying unit. Vice versa, when the device is in a configuration where a small amount of force is needed to bring about a certain change in spring length, that certain change in spring length is associated with a small change in displacement between the connection unit and the load carrying unit.

In embodiments, the leverage unit is arranged to couple the pneumatic spring to convey a torque. The leveraging unit can be any pivoting or rotating mechanical structure, such as a pivoting arm, which substantially counteracts an increasing/decreasing force of a spring, in such a way this results in a constant (upward) force delivered by the pneumatic spring, enabled to be coupled to an opposite (downward) force on a load such as gravity.

Further, in embodiments of operation, moving of the transmission in results reducing or increasing the force exerted by the pneumatic spring. The transmission of the balanced heave compensator is preferably arranged to define a variable distance between the connection point and the carrying unit (or the load connected thereto). This distance is, in use, varied to balance the load in the z-direction. The pneumatic spring can extend or compress by moving over a stroke length which requires a force, which is dependent on the extension of the spring, the force increasing with larger extension (in case of engaging an extension spring). The transmission, including the spring force balancing arrangement, couples the extension of the pneumatic spring in such a way that the stroke length of the pneumatic spring is relatively small for a range of extension of the spring which requires a large force and is relatively large for a range of extension of the spring which requires a small force. In embodiment the transmission couples the extension of the pneumatic spring to (an equal change in) the distance between the connection point and the carrying unit.

Preferably the leverage unit and the pneumatic spring are adapted to each other. E.g. if the pneumatic spring has a certain range of movement at which the exerted force changes more than at another movement range, the leverage unit is coupled such that it also changes more in that certain range of movement. However, preferably the pneumatic spring approximates linear spring behavior (Hooke's law) and preferably the leverage unit is a linear unit, such as a pivoting arm.

Preferably the carrying unit mounted on a second frame, whereas the connection unit is mounted on the first frame. The transmission couples the first and second frame and allows them to move with respect to each other.

In an embodiment, the (gas- or) hydro-pneumatic spring is arranged to apply the force at a first point of application on the first frame or on the leverage unit, such as a pivoting arm or pivoting spring, and a second point of application on the first frame or on the leverage unit, such as a pivoting arm, wherein said spring pivots around at least one of said points of application in use. In use can be during an extension or contraction of the (gas- or) hydro-pneumatic spring, and/or wherein said spring pivots during a movement of the leverage unit relative to the (gas- or) hydro-pneumatic spring, connection unit and/or carrying unit; and/or wherein said spring pivots during a movement of the connection unit relative to the carrying unit. The pivoting action results in a leverage and, as a result, allows smaller sized (gas- or) hydro-pneumatic springs.

In an embodiment the pneumatic spring is arranged to apply the force at a first point of application on the first frame and a second point of application on the leverage unit, such as a pivoting arm, wherein a point of the leverage unit, the first point of application and the second point of application define a triangle having an area correlated with the torque applied on the carrying unit. In embodiments the triangle has an area correlated with the torque applied in the point of the leverage unit. This configuration allows spring balance decoupling.

In embodiments a second frame connects the carrying unit to the transmission. The first or the second point of application can also be on the second frame.

In embodiments the leverage unit is formed by an arm. In embodiments the transmission comprises at least two pivoting arms that have pivoting points. The arms can connect the two frames either parallel or serial. Parallel arms allow splitting of the suspension forces, thereby allow reduction of the dimensions of the beams used for the arms. This further compacts the device.

Preferably the first and second frames extend generally along the guideline and the pivoting arms extend on opposite sides of that guideline. Preferably the arms are arranged as a rhombus. This allows a compact arrangement of pivoting arms. The forces are transferred symmetrically around the guideline.

In embodiments the pivoting points positioned generally symmetrically around the guideline. In embodiments the two arms are connected by a pivoting point to the first and second frame respectively.

In a very special embodiment a single arm is both the leverage unit and the spring. In this arrangement the spring is pivotably connected to the first and to the second frame. In this arrangement, a movement of the carrying unit with respect to the connecting unit changes both the angle under which the spring is exerting a force on the carrying unit as well as the length of that same spring. Under special circumstance this could result in a torque remaining generally constant.

In an embodiment one of the frames envelops the other, allowing the two frames to only move along one line with respect to each other, i.e. forming a linear guide.

In an embodiment, two pneumatic springs are connected via pivoting points to one of the frames and via pivoting points to each of the arms. Multiple springs allow supplying parts of the balancing forces.

Preferably, the two springs are arranged symmetrically around the guideline.

Preferably, each spring is connected to one of the elbows of the rhombus.

All the above arrangements allow further compact embodiments, which further helps to reduce the overall dimensions of the heave balancing device and thereby eases the use thereof in existing hoisting devices.

In one embodiment, the pneumatic springs are arranged within a rhombus formed by the arms of the transmission, allowing them to function as extension springs.

In another embodiment, the pneumatic springs are arranged outside a rhombus formed by the arms of the transmission, allowing them to function as compression springs.

In an embodiment, the transmission comprises two pivoting arms, arranged symmetrically around the guideline. The pneumatic spring is connected between the two different arms of the transmission via pivoting points, and can compress or extend.

Preferably, the pneumatic spring is arranged between points near to the elbows of the arms of transmission. This allows for efficient force guiding through the transmission. Preferably, the pneumatic spring is arranged between the pivoting points of the arms of the transmission, for the same reason.

In an embodiment, the pneumatic spring and its spring characteristic is able to be configured, preferably while in operation. This enables the spring to compensate for a change in load gravitational force when picking up/dropping off a load, or when submerging the load under water or raising it above it. Additionally, it enables the device to move the load in a controlled manner.

In an embodiment, the transmission comprises a rotating element having a thread with a variable pitch. The rotating element functions as a winch, where a line is threaded along the variable pitch, and connects the load to the rotating element.

In embodiments, the pneumatic spring is connected via a line to the rotating element (that forms the leverage unit) and via a pivoting point to the first or second frame. Preferably, the spring line is connected to a different thread than the load line, the spring thread not having a variable pitch. The load being connected to a line on a variable pitch thread results in a varying torque being applied to the rotating element depending on how far the line is wound. This variable pitch thread is coupled to the spring characteristic; a rotation of the rotating unit results in both a change in the spring length as well as a change in the pitch of the variable pitch thread. This varying torque in combination with the spring characteristic of the pneumatic spring, allows for the system to be substantially balanced across a range of load heights. In addition, an actuator can provide force to overcome disbalance. Preferably the spring is connected to the variable thread and the load to the non-variable thread.

In an embodiment, an actuator is employed. This actuator can be used to drive a distance between the first and second frame. In an embodiment, the actuator is connected between the frames directly, for example via a toothed gear on one frame and a toothed track on the other. In an embodiment the actuator acts on the piston of the (gas- or) hydro-pneumatic spring but on the side of the piston opposite to the side of the piston where the force of the gas is applied. In an embodiment the actuator is coupled to a leverage unit, preferably the same leverage unit as the pneumatic spring. The actuator can provide an additional force to compensate for non-ideal spring balance behavior of the spring balance arrangement. The actuator can further be used to drive the system, e.g. lift or lower the load.

In an embodiment, the actuator is driven by a control system receiving signals from a motion reference unit. In an embodiment the motion reference unit is connected to the heave balancing device. Global Positioning System (GPS) devices and/or other relative or absolute distance meters, for example laser distance meters, may also be employed to measure (absolute or relative) positions. The motion reference unit, GPS devices and/or distance meters may be placed at various points, for example on board of the vessel, on the tip of the crane, on the load, at the targeted landing point etc.

In an embodiment, the transmission has a range, over which the frames can move with respect to each other. To ensure the range boundaries, a security arrangement is employed. The security arrangement can comprise i.e. an actuator, driving the distance between the first and second frames. The actuator can comprise a toothed gear on one frame, and a corresponding toothed track on the other. By exerting a force on the first and second frames, the transmission can be biased to stay within the boundaries. Heave balancing devices can run away even in stable conditions. The heave balancing device will slowly move away from a middle or default position. To prevent the heave balancing device from reaching the maximum (end of) stroke position, at which the decoupling function of the heave balancing device would suddenly stop and enormous forces could arise, the security arrangement prevents such running away.

According to a different aspect of the invention a hoisting system for balancing a load lifted is provided comprising a hoisting line connected to the hoisting device, a connection unit suspended to the hoisting line, a transmission coupled to the connection unit, the transmission having a spring force balancing arrangement with a leverage unit and with one or more configurable pneumatic springs and a load carrying unit connected to the transmission, which can carry or support the load. The leverage unit can be an arm or can be a rotating element or can be a lever as described herein.

In embodiments the hoisting systems comprises an actuator coupled to the transmission. Preferably the actuator is coupled to the pivoting arm or to the pneumatic spring. The actuator can be positioned between the carrying unit and connection unit, or can be positioned on the hoisting device and coupled to the transmission via e.g. a further hoisting line.

According to a further aspect a method for carrying a load with a hoisting device is provided. The method can comprise connecting a hoisting unit of a heave balancing device according to any of the embodiments to the hoisting line of the hoisting device. The method can comprise carrying a load by connecting a load to the carrying unit of the heave balancing device. The method can comprise configuring the pneumatic spring to the load.

Further the method can comprise, dependent on the load and/or dependent on the non-linear behavior of the pneumatic spring in operation and/or to secure safe operation of the hoisting device:
configuring the pneumatic spring to the load; and/or
positioning of one or more pivoting points in the transmission; and/or
extending one or more arms of the transmission; and/or
actuating the one or more actuators.

Yet another aspect of the inventions provides for a kit of parts for fitting spring balance to a hoisting or support device, the kit comprising a connection unit for connecting to a drive element of a hoisting device or a support device, a carrying unit for connecting to a load, a transmission comprising a leverage unit and configurable a pneumatic spring in a spring balance configuration, the transmission arranged to couple the connection unit and carrying unit.

The kit can further comprise an actuator for coupling to a part of the transmission, e.g. the pivoting arm. Preferably the leverage unit is formed by rotatable element having a thread with a variable pitch. In other embodiments the leverage unit is formed by one or more arms, preferably multiple arms arranged serially and parallel between the carrying unit and connection unit.

Embodiments of the method and kit of parts can comprise tow or tug or tag lines or XY compensation systems to allow for movement guidance in the XY plane additional to the balancing action in the z direction.

Any of the embodiments or aspects of the invention can be combined with any of the features disclosed herein, unless explicitly mentioned to the contrary. The invention will now be described with reference to the drawings. Embodiments of the invention encompass, instead of a hoisting device, a support structure on a ship that lifts/ supports a load via the (heave) balancing device. The connection unit does not have to be connected to a hoisting line.

Although the drawings show several embodiments, the invention is not limited to the shown embodiments.

Figure 1:
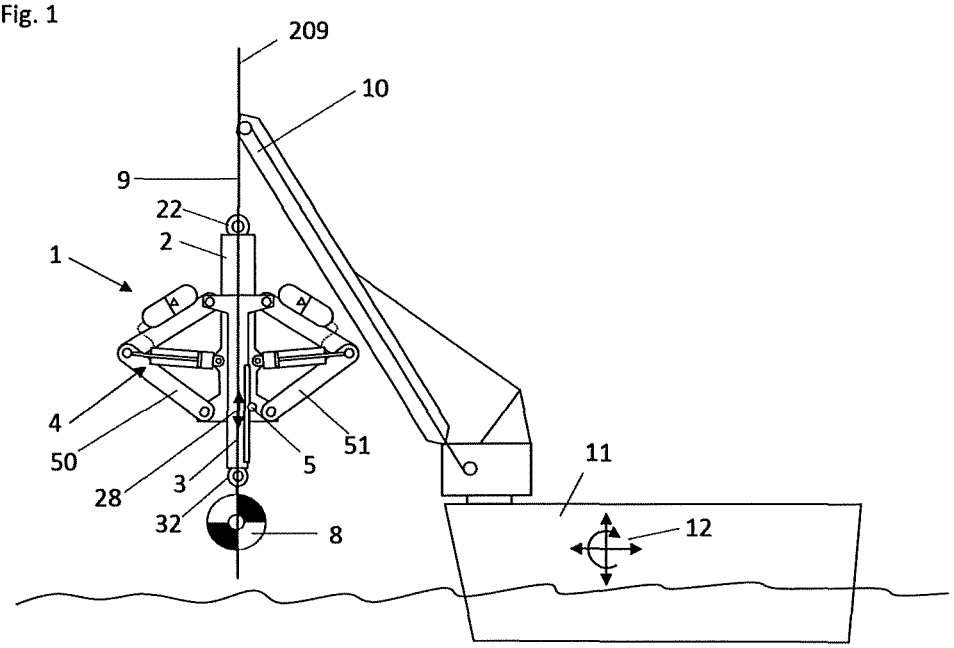
FIG. 1 shows a schematic hoisting device with heave balancing device according to a first embodiment with a rhombus arm arrangement.
Figure 1A:
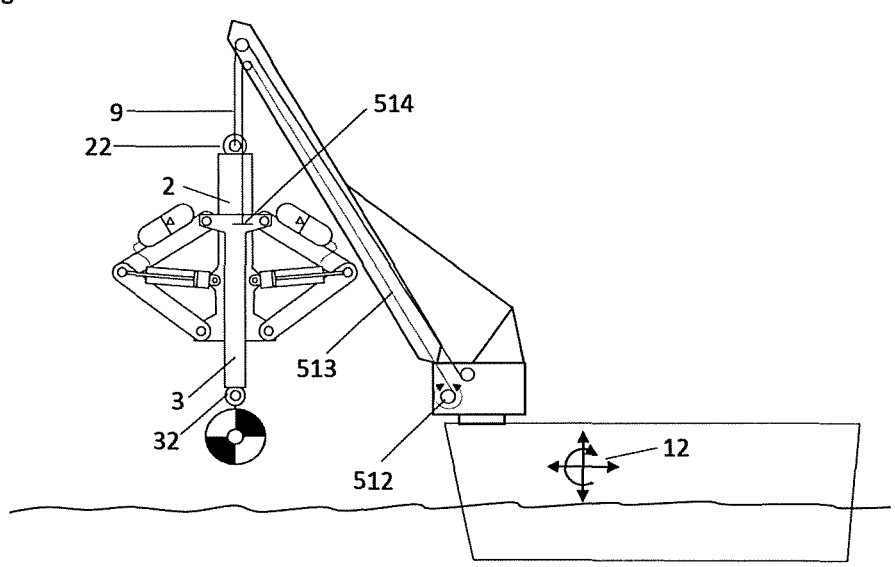
FIG. 1a shows a schematic hoisting device with heave balancing device according to a second embodiment with an actuator placed onboard the hoisting device.
Figure 1D:
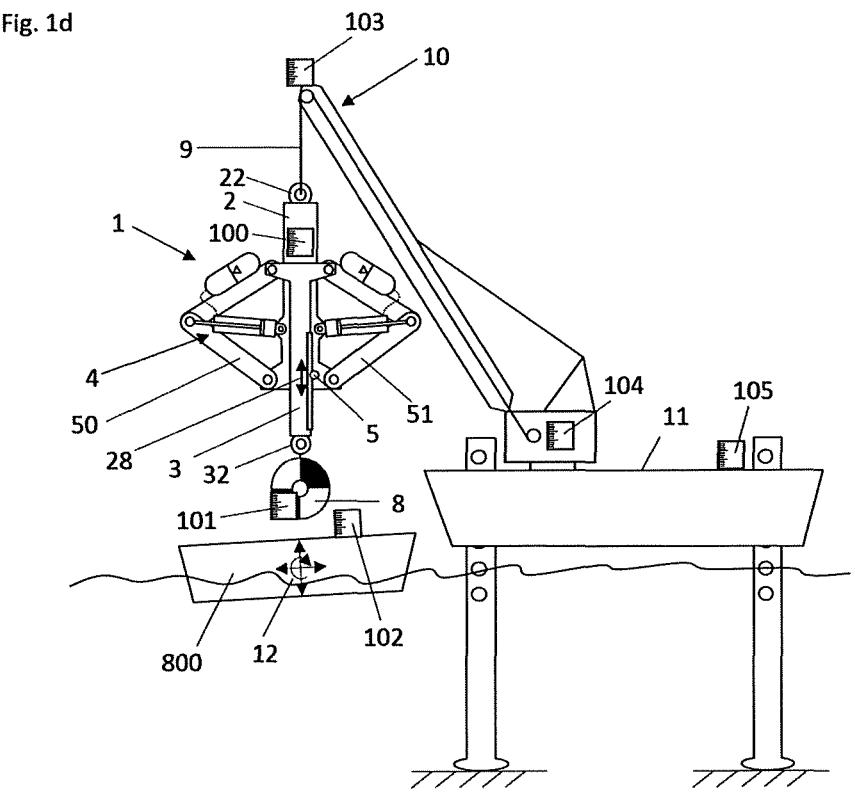
FIG. 1b shows another schematic hoisting device with heave balancing device according to a third embodiment having a double rhombus arm arrangement.
Figure 1E:
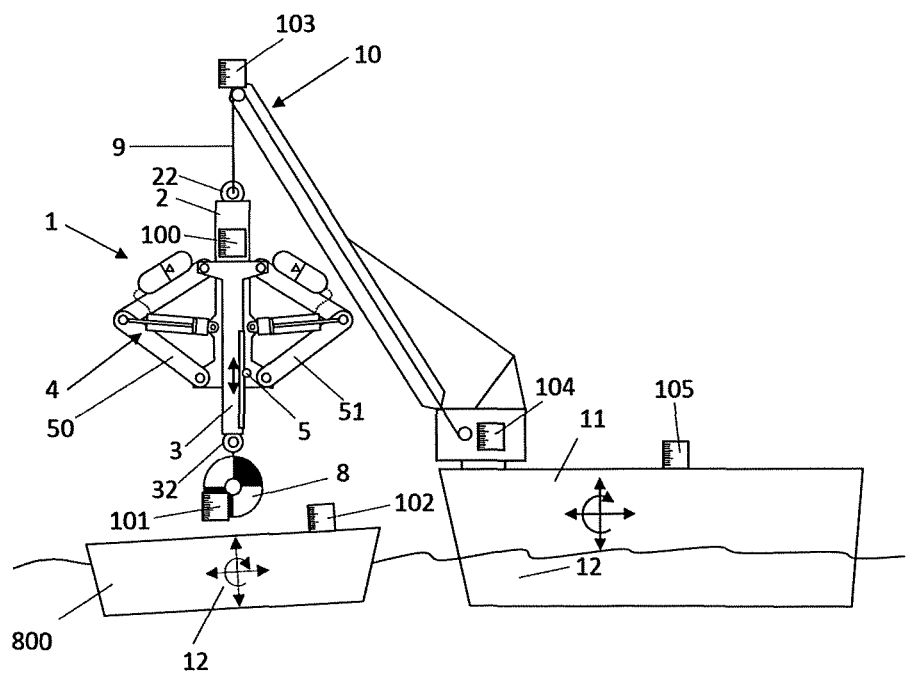

FIG. 1c-e show a schematic hoisting device with heave balancing device according to a first embodiment with a rhombus arm arrangement, in various situations.

Figure 1F:
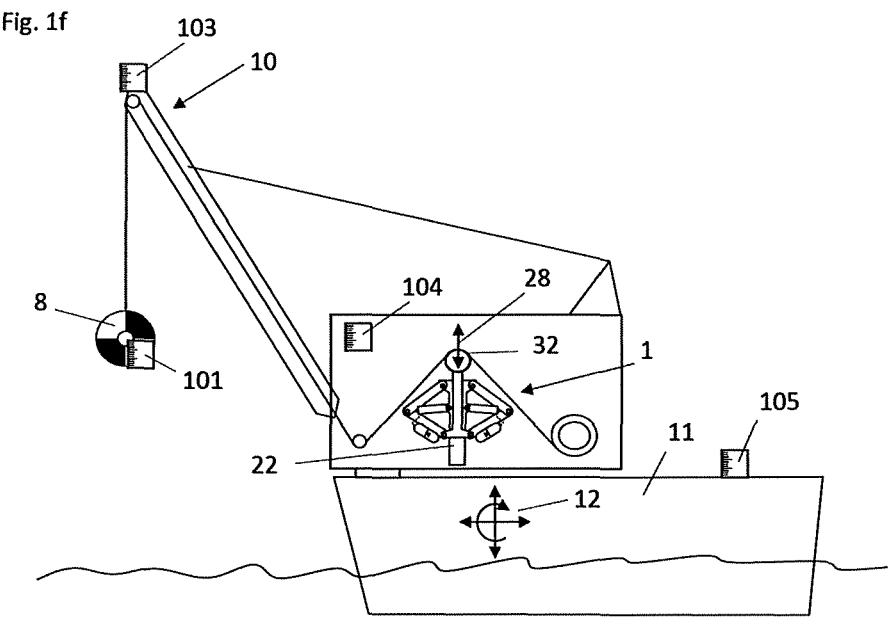

FIG. 1f shows a schematic heave balancing device incorporated in a hoisting device according to an embodiment.

Figure 1G:
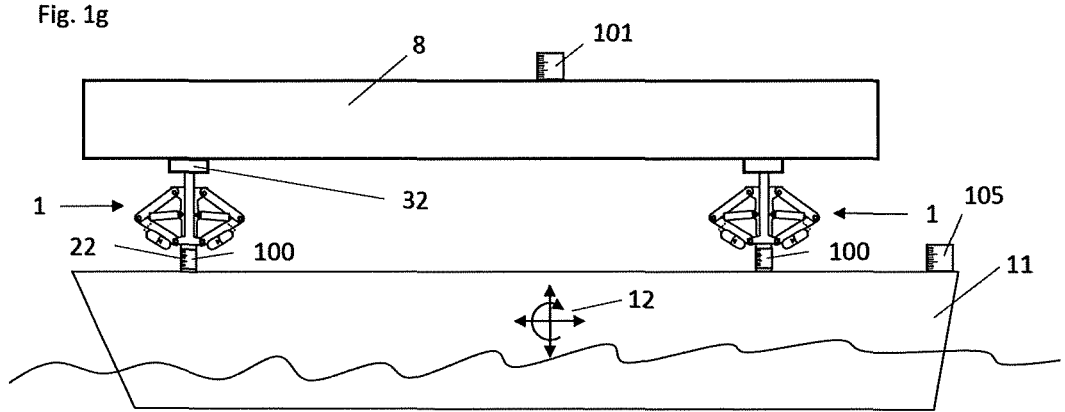

FIG. 1g shows a schematic heave balancing device according to an embodiment.

FIGS. 2a-d show prior art embodiments.

Figure 3:
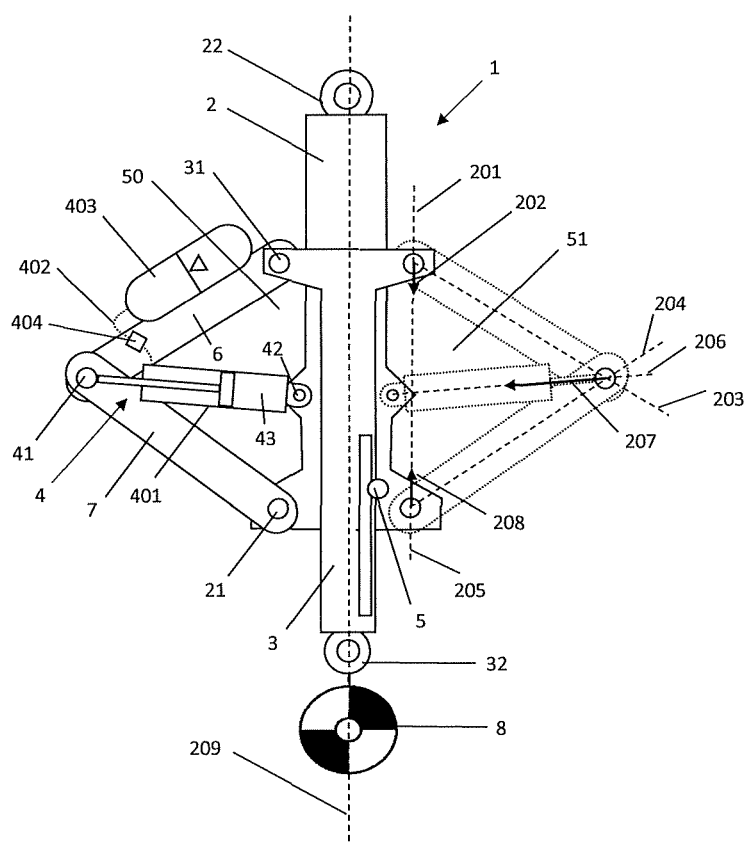

FIG. 3 shows a schematic heave balancing device according to a $4^{th}$ embodiment in more detail.

Figure 4A:
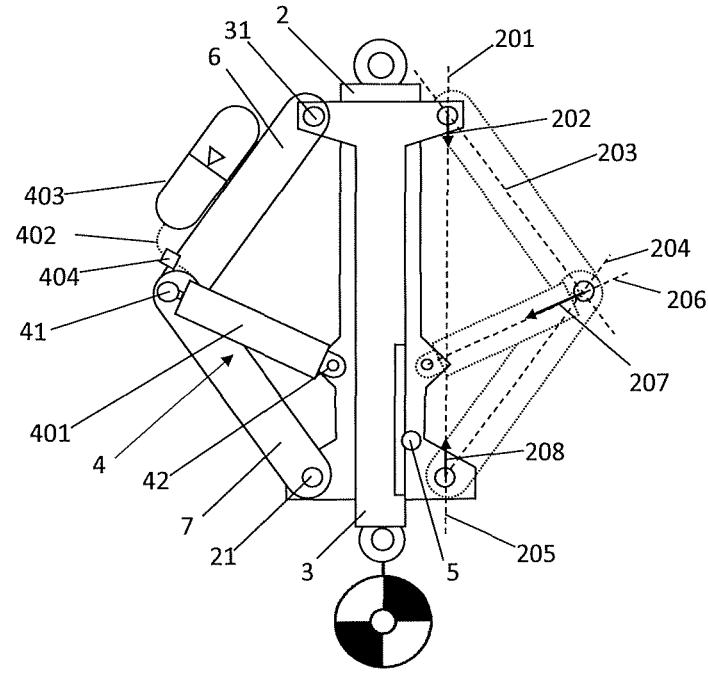

FIG. 4a shows the schematic heave balancing device of FIG. 3 in a different position.

Figure 4B:
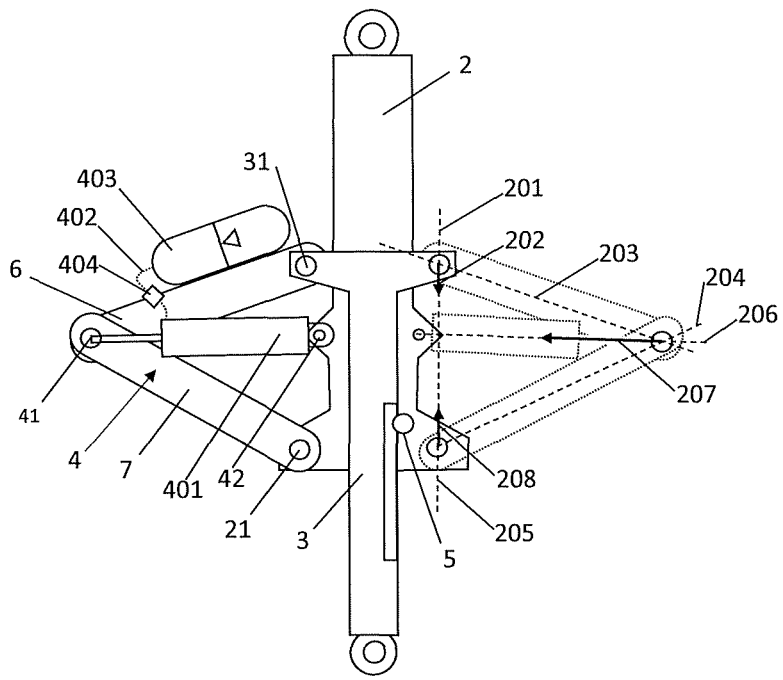

FIG. 4b shows the schematic heave balancing device of FIG. 4a in a different position.

FIG. 5 shows a schematic hoisting device with heave balancing device according to a $5^{th}$ embodiment with a single extension spring.

FIG. 6a shows another schematic hoisting device with heave balancing device according to a $6^{th}$ embodiment with a single compression spring engaged as an extension spring.

Figure 6B:
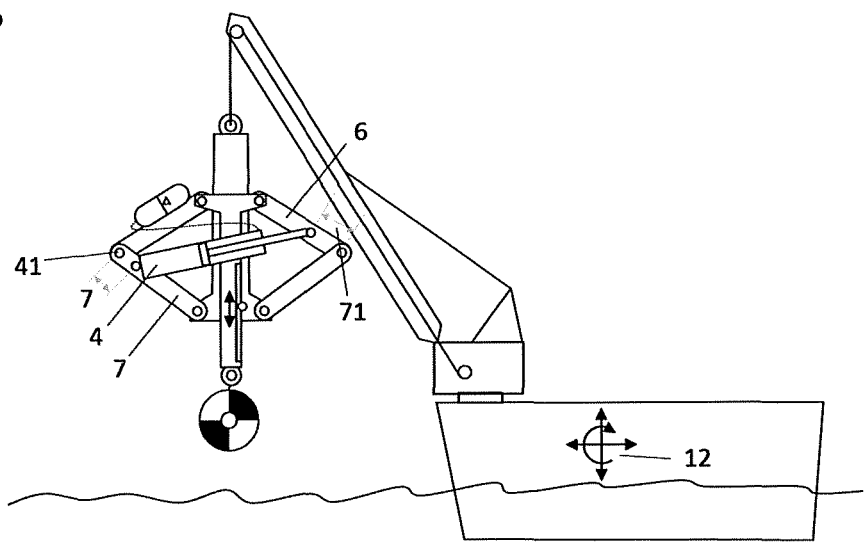

FIG. 6b shows a schematic hoisting device with heave balancing device according to a $7^{th}$ embodiment with a single extension spring having connection points on the arms.

Figure 6C:
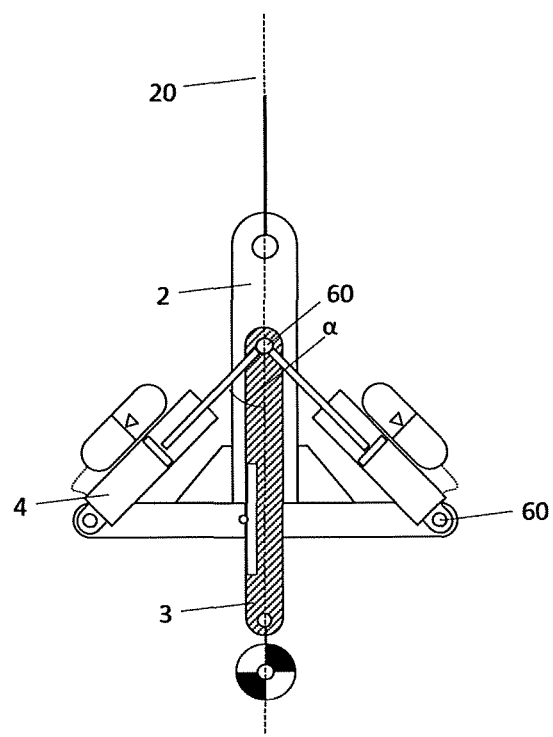

FIG. 6c shows a schematic heave balancing device according to a $8^{th}$ embodiment comprising two compression springs.

Figure 6D:
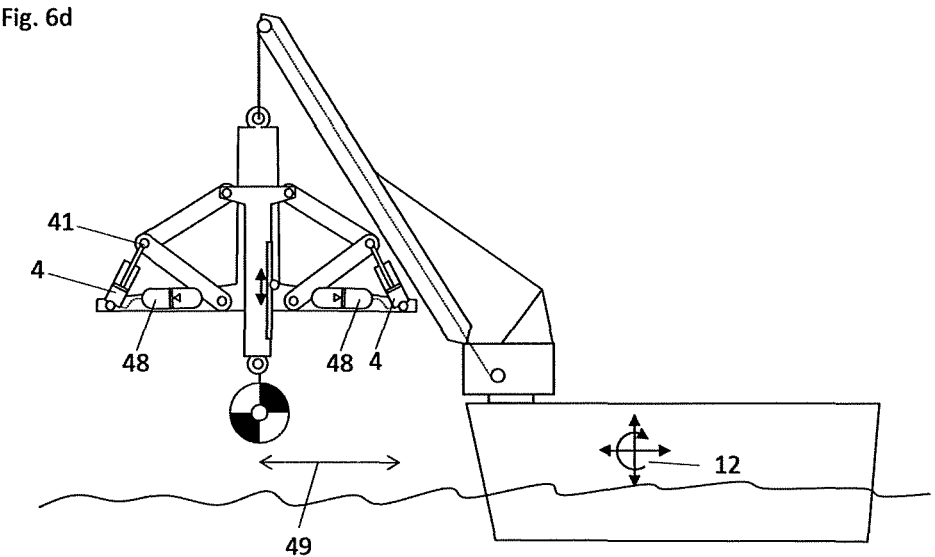

FIG. 6d shows a schematic hoisting device with heave balancing device according to a $9^{th}$ embodiment with two compression springs and two rhombus arm arrangement.

Figure 6E:
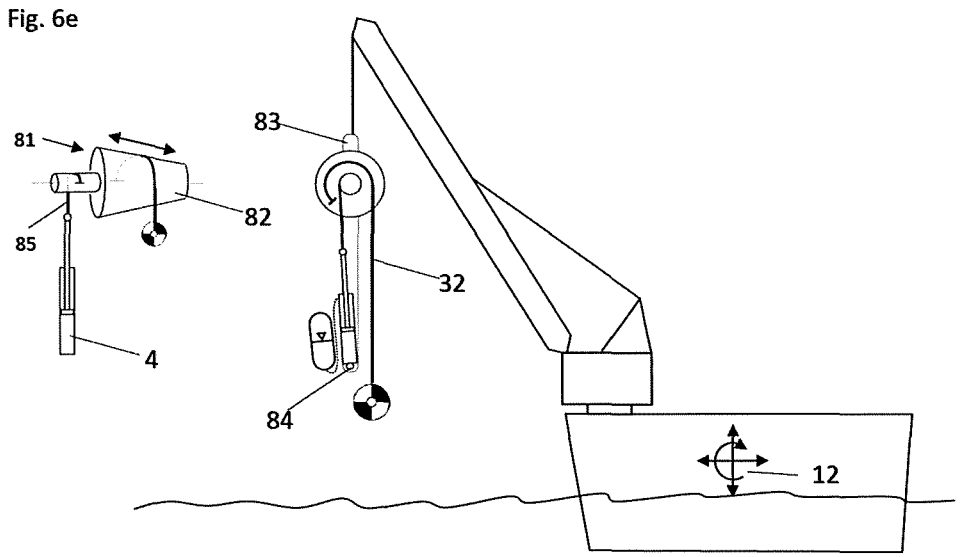

FIG. 6e shows a schematic hoisting device with heave balancing device according to a $10^{th}$ embodiment, wherein the leverage unit is formed by a rotating element.

FIG. 1 shows an embodiment of a heave balancing device 1 according to an aspect of the invention. The heave balancing device 1 is lifted by a hoisting line 9, formed by a wire. In this embodiment, heave balancing device 1 is lifted by a crane or hoisting device 10 mounted on a floating vessel 11. Although in this application a crane 10 is used to illustrate the invention, clearly any kind of support structure on a heaving ship can be used. In this embodiment, the heave balancing device is positioned to replace a part of the hoisting line 9.

The heave balancing device 1 will transform an existing non-spring-balanced crane, in this case a crane 12 on a vessel 11, into a crane that operates using balanced heave compensation. The heave balancing device 1 of this embodiment allows to add a balanced heave compensation feature to existing high-load cranes without having to make costly adaptations to the existing crane equipment. In this case the heave balancing device is connected to the system (vessel 11) that experiences heaving.

The heave balancing device could also be connected and disconnected to any type of mechanical support or suspension system which is mounted on the ground or for example onto an off-shore platform as illustrated in FIG. 1d.

In this application a heave balancing device 1 can be a device that balances a load at different positions or can be a device that generally balances the load, preferably by spring loaded means. Embodiments of the heave balancing device comprise balancing a load at different positions of the heave balancing device, the balancing force being provided for the most part by spring loaded means, preferably (gas- or) hydro-pneumatic spring systems. Preferably loads of over 10 tons, preferably over 20 tons, and more preferably over 30 tons are supported and balanced using a heave balancing device 1.

In FIG. 1, the heave balancing device 1 has a connection unit 22 that connects to the drive element 9 of the hoisting device. The connection unit 22 is a ring, which forms an integral part of a first frame 2. Further a carrying unit 32, also formed by a ring, is connected to the load. The carrying unit 32 is an integral part of a second frame 3. The frames 2 and 3 can move with respect to each other. In this embodiment, the transmission comprises a guide, preferably linear, for guiding the movement of frames 2 and 3 with respect to each other. In the embodiment, the hoisting point and load carrying point will be arranged on a vertical line and the guide allows movement along this vertical line.

In the embodiment, the transmission, comprising the guide, allows moving connection unit 22 with respect to carrying unit 32 by increasing or reducing the distance, indicated by an arrow 28, between those two suspension points 22,32. In balanced operation the suspension points are oriented along the vertical line, here the guideline 208. Preferably the transmission comprises one or more arms for transferring forces between the suspension points, the arm being positioned non-parallel, preferably at an angle between 10-170 degrees, with respect to the guideline 208/ the direction of the guide. In use the arms are at an angle with the vertical direction. Preferably one or more arms are pivotable with respect to a first frame 2 or second frame 3.

Preferably the heave balancing device 1 comprises at least one transmission having a leverage unit 50,51 and a pneumatic spring 4. The leverage unit is preferably a linear leverage unit and more preferably a pivoting arm 50,51. The pivoting arm is connected to one of the frames 2,3 or to both. The spring 4 is preferably a gas or hydro-pneumatic spring. In this embodiment the arms 50,51 and the spring 4 are connected to the first frame by means of a pivoting connection point. The pneumatic spring and the leverage unit cooperate to result in an upward force that is generally constant over the stroke of the pneumatic spring. The leverage unit and spring are therefore arranged in a spring balance configuration. Preferably, the spring approximates perfect (Hooke's law) behavior, where the spring force is linear to the stroke. In combination with a pivoting arm, this results in a spring balanced system.

In this embodiment the leverage unit and the pneumatic spring art part of the spring force balancing arrangement. In embodiments the spring force balancing arrangement is arranged to compensate for changes in the load. Examples of compensating for change in the load are allowing, in operation, moving of the pivoting point of the arm, thereby changing the length of the arm of the applied force. Another embodiment can have an arm that has a variable length.

Alternatively, other systems which perform a similar balancing function (for example 4 armed (hydro-pneumatic systems or systems with a single (hydro) pneumatic spring)

can also be used. Further examples of other possible balancing systems are also provided (FIG. 6a-e). Alternatively, the heave balancing device 1 comprises a transmission having a rotating member with both a fixed and a variable pitch. Alternatively, the spring itself is the transmission, by way of a changing angle when the position of the load changes.

In FIG. 1, the transmission couples the connection unit 22 to the carrying unit 32, preferably by coupling the first frame 2 to the second frame 3. In FIG. 1 the transmission of the heave balancing device 1 has two leverage units in the form of arm assemblies 50,51, each comprising two pivoting arms connected by pivoting points. The two arm assemblies together form a rhombus arm arrangement. The arm assemblies 50, 51 allowing pivoting of one or more arms. In this embodiment, a double (gas- or) hydro-pneumatic spring system 4 is provided. In this embodiment, each arm assemblies 50,51 has a (gas- or) hydro-pneumatic spring system 4. The (gas- or) hydro)-pneumatic spring system 4 is configurable. It comprises a gas volume that is connected to the spring by a valve system. By filling or unloading gas from the cylinder, or by changing the amount of oil between the gas and the cylinder, the gas pressure can be increased and decreased. This allows configuring the spring force. A (gas- or) hydro-pneumatic spring may have behavior close to a linear spring constant.

In the shown embodiment the heave balancing device 1 includes an actuator 5. The actuator 5 can provide a force additional to the spring-loaded means. The additional force can compensate for non-linear behavior of the spring-loaded means or can provide a force for biasing the load towards a default position of the heave balancing device. The additional force can also bring about movement of the first and second frame, thereby lifting/lowering the load in the vertical direction. In the shown embodiment the actuator is connected to the first and second frame. Actuation results in direct movement of the first frame with respect to the second frame, while the transmission is also moved.

In embodiments of the heave balancing device according to the invention, movement of the ship along the z-axis is compensated by use of the spring balancing arrangement that is part of the transmission. The heave balancing device 1 comprises the spring or arm. The heave balancing device will have a state in which the spring is connected not-in-line with the load, in such a way that a change in the position of the load does not change the elongation of the spring along a linear characteristic. The spring is configured in such a way that a change in the force of the spring is (substantially) counteracted by the transmission, in particular the leverage unit. According to the invention the leverage unit and pneumatic spring are arranged to provide a torque to generally balance a torque provided by the load. In embodiments the load is, additional to being compensated for heaving motions by the heave balancing device 1, held by towlines to control the movement of the load in the X and Y directions (perpendicular to the Z-position that is balanced) or other conventional means to control the movement of the load in the X and Y directions such as actuation of the tip of the crane.

Figure 2A:
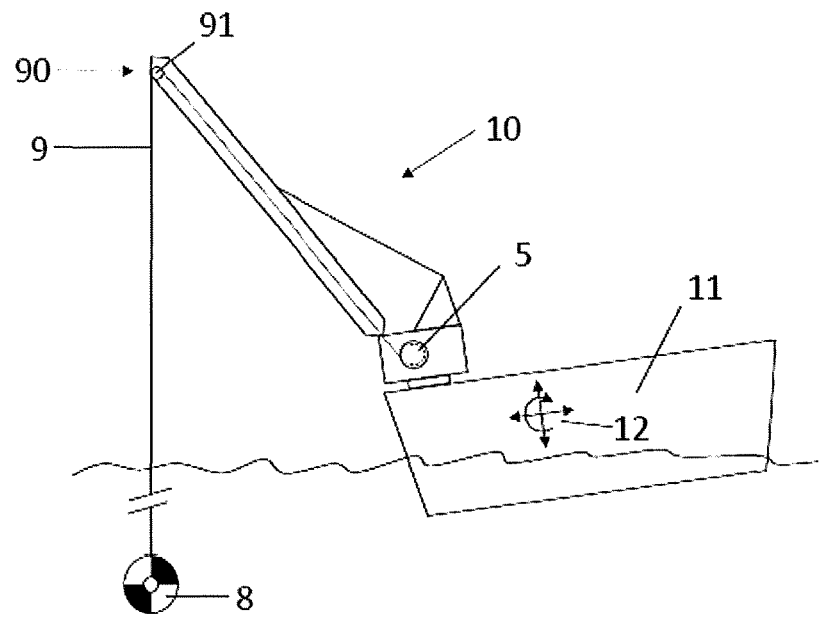
Figure 2B:
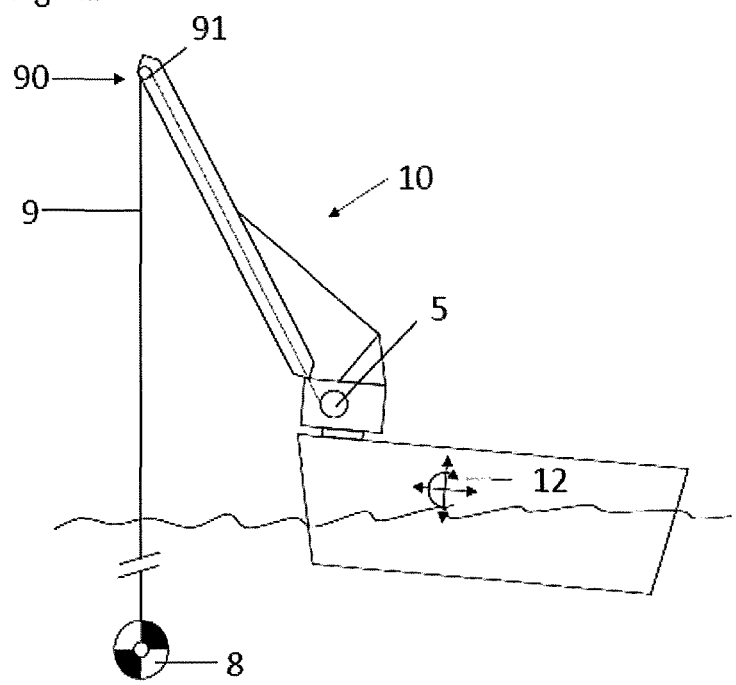

The heave balancing device 1 allows movement of the ship 11 in the z-direction to be compensated. The heave balancing device according to the invention will result in the load remaining generally at the same (absolute) height during heaving (and/or rolling or pitching) motions, as shown in FIGS. 2a and 2b.

FIG. 1a shows a very similar embodiment as the embodiment of FIG. 1. However, in FIG. 1a the actuator 512 is positioned on the hoisting device 10. A line 513 connects the actuator 512, here embodied by a actuated reel, to frames 3 or directly to the load 8, here a connection 514 on second frame 3. The embodiment of FIG. 1a generally provides the same operation as FIG. 1, but shows that the actuator can be separate from the heave balancing device. This has the benefit the part of the heave balancing device hoisted under line 9 can be relatively small.

In embodiment the position of the ship the load of the heave balancing device 1 is monitored controlled. On the basis of the measured data an actuator can adjusts a tool (for example, a winch, a pneumatic arm system) accordingly. Preferably the monitoring and control system comprises a motion reference unit which is preferably located within the heave balancing device.

In FIG. 1b, a transmission is shown comprising four arm assemblies. Two arm assemblies 63,64 are shown in the front view forming a rhombus arrangement. A second pair of arm assemblies of which one arm assembly 65 is visible in the front view is arranged similarly in a rhombus arrangement. This embodiment with two sets of arm assemblies has two rhombus arm arrangements. In this set up four (hydro) pneumatic springs are arranged to provide a balancing force. The four (hydro) pneumatic springs are connected between first frame 2 and the force guiding and pivoting points on the four arm assemblies. This embodiment has the benefit the heave balancing device can be stronger in order to balance larger loads. Embodiments with three or more rhombus arm arrangements are possible in order to balance very heavy loads.

The load may have a targeted landing site 800. FIG. 1c shows an embodiment of the heave balancing device 1 of FIG. 1, wherein the targeted landing site 800 is a platform under sea level. In FIG. 1d, the targeted landing site 800 is on a vessel, and the hoisting device 10 is provided on a platform 11. In FIG. 1e, the targeted landing site 800 is on a vessel, and the hoisting device is provided on another vessel 11.

FIG. 1c shows the heave balancing device 1 of FIG. 1 with additional sensors 100-105. Here, sensors can include active and passive elements, e.g. a mirror. Sensors 100-105 are disposed at various locations on and around the illustrated system, such as sensor 100 on the first frame 2, sensor 101 on the load 8, sensor 102 on the targeted landing site 800, sensor 103 at the tip of the crane 10, device location 104 at the base of the hoisting device 10, sensor 105 on the vessel 11. These sensors may be for example motion sensors or position sensors, including distance meters, motion reference units, GPS devices, etc. The information provided by the sensors can allow for active compensation if needed.

FIG. 1d shows a different possibility of employing the heave balancing device 1 of FIG. 1. Here, the targeted landing site 800 is on a vessel, and the hoisting device 10 is provided on a platform 11. Again, various measuring sensors 100-105 may be employed at various points similar to FIG. 1c. As the vessel heaves 12, the load is moved vertically together with the vessel allowing onboarding or deloading of the load despite the heaving.

FIG. 1e shows a further possibility of employing the heave balancing device 1 of FIG. 1. Herein, the load 8 is transported to a targeted landing site 800 on a vessel, while the hoisting device is disposed on another vessel 11.

FIG. 1f shows an embodiment of the heave balancing device 1 being incorporated within the hoisting device 10 on the vessel. In this embodiment, the heave balancing device 1 is fully integrated within the crane 10. In this embodiment, the device 1 is turned upside down when compared with the embodiments of FIGS. 1-1e. Connection unit 22 is positioned, preferably attached, to the floor of the crane 10. Carrying unit 32 comprises a pulley illustrated schematically. The pulley will experience an upward force as a result of the heave balancing device 1. The load 8 is suspended from a line, and the line is lead over the pulley, which can move up and down 28. When the pulley of the heave balancing device 1 moves down, the load 8 can move downwards relative to the tip of the crane 10. When the pulley moves up, the load 8 is also pulled up relative to the crane 10. Once the springs of the heave balancing unit 1 of FIG. 1f are configured to the actual load 8, the heave balancing unit 1 can provide decoupling by generally spring balancing at multiple angles of the arms with respect to the frame of the heave balancing device 1. A benefit of this embodiment is the maximum hoisting height of the crane is not affected by the heave balancing device 1 between the crane hook and the load. In this embodiment, in comparison with the embodiments of FIGS. 1-1e, the heave balancing device is to be designed to allow a longer stroke, as a result of the hoisting line being guided at an angle, here about 45 degrees. Also not the full weight of the load 8 is carried by the heave balancing unit 1 in this set-up, allowing the design of a less rigid device 1 in comparison with FIGS. 1-1e.

FIG. 1g shows an embodiment of two or more heave balancing devices 1 being used to balance a load 8 on a vessel 11 by providing a balanced upward pushing force. Also in this embodiment, the heave balancing devices 1 are sandwiched between the load 8 and the support 11 transferring the forces between opposite side of the heave balancing device 1. The carrying unit 32 preferably makes a small, point contact with the load 8. The connection unit 22 is supported, e.g. directly attached, to the floor of the vessel. The two or more heave balancing devices 1 compensate the heaving motion 12 of vessel 11, such that the load 8 stays substantially at the same height and substantially horizontal. There may be more than two devices, like for example three devices in a triangular configuration.

FIG. 3 shows a more detailed embodiment of heave balancing device 1. The heave balancing device 1 comprises a first frame 2 having a connection unit 22 for suspension to a hoisting device. The heave balancing device 1 further comprises a second frame 3 having a carrying unit 32 for suspending or supporting a load. The first frame 2 and second frame 3 move with respect to each other along a linear guideline 209, said linear guide provided by a transmission. Preferably the connection unit 22 and/or the carrying unit 32 are positioned on the guideline 209. Preferably, in operation, the guideline 209 is generally parallel to the gravitational force, although in some embodiments, as result of heaving, this can change.

The transmission has one or more force application points, such as pivot connections 41, preferably outside linear guideline 209, preferably arranged symmetrically around the guideline. Force application points are preferably arranged so the force field is guided symmetrical around the guideline. Preferably forces transmitted through said one or more force application points are not in line with, that is non-parallel to, the guideline 209. Preferably the orientation of the (hydro-)pneumatic spring 4 said forces change when frames 2 and 3 move with respect to each other and/or when the distance between the connection unit and the carrying unit changes.

In this embodiment, the transmission comprises two leverage units in the form of arms assemblies 50, 51. Arm assemblies 50,51 work simultaneously and identically, thus for clarity's sake, the mechanical parts are labelled on the left-hand side and the virtual construction lines and forces are shown on the right-hand side of FIG. 3. Left hand arm assembly 50 comprises an arm part 7 and a balancer arm 6. Arms 6,7 are connected to each other via a pivoting point 41. In the embodiment shown in FIG. 3, a force guiding point is pivoting point 41.

The heave balancing device 1 comprises a first frame 2. On the frame engagement points are provided. Engagement point 21 is a pivot point that allows pivoting of arm 7. Engagement point 22 is a connection unit for suspension to a hoisting device.

Through pivot point 21 and pivot point 31, a virtual construction line 205 along the z axis and parallel to the guideline 209 can be constructed, along the direction of the lifting force of first frame 2 on first arm part 7, and along the direction of movement of pivot point 21 with respect to second frame 3.

The (hydro) pneumatic spring system 4 is connected to first frame 2 via pivoting connection point 42. The (hydro) pneumatic spring system 4 comprises a cylinder 401, a hydraulic connection 402 and a hydraulic accumulator 403. The (hydro) pneumatic spring system can be configured. The system 4 allows setting the spring force of the (hydro) pneumatic cylinder 401. One chamber of cylinder 401 may be connected to a hydraulic accumulator and will have a relatively high pressure of up to 300 bar or even 600 bar, the other chamber on the opposite side of the piston of cylinder 401, chamber 43, may have a limited, relatively low pressure, for example 1-10 bar at minimum compression of the spring. When compressed, the gas pressure in the chamber with relatively low pressure increases. This helps to prevent the heave balancing device to suddenly reach end of stroke and it allows for better balance given the non-linear and adiabatic characteristics of a gas spring.

First frame 2 comprises a guide that guides a second frame 3. The second frame 3 is guided in a direction along the z-axis and parallel to guideline 209, allowing for the hoist connection point and the load connection point to move with respect to each other.

The second frame 3 has pivot points. Pivot point 31 is connected to the balancer arm 6 of arm assembly 50. Balancer arm 6 can pivot with respect to pivot point 31.

Through point 31, a virtual construction line 201 along the z-axis can be constructed, representing movement of point 31 with respect to first frame 2 and the forces (such as due to gravity) exerted upon pivot point 31 in the z-axis. Preferably both points 31 and points 21 are positioned at similar radial distances from the guideline 209, located along virtual construction line 201 to allow for a balanced configuration. Preferably virtual construction line 201 is in a radial direction away from guideline 209 positioned between point 42 and point 41: locating point 41 not on construction line 201 but a bit closer towards guideline 209 (or farther away from point 41) allows for even better balance.

Arms 6 and 7, part of the transmission, are connected at pivot point 41. In this embodiment pivot point 41 also forms a point of force application for (hydro) pneumatic spring system 4.

The (hydro) pneumatic spring system 4 is arranged as a pulling device. The spring force is applied between application points 41 and 42. Along points of spring force application 41 and 42, a virtual construction line 206 can be drawn and a force 207 is shown. The downward force 202 induced by the load on frame 3 is balanced by the upward force 208 induced via the pneumatic spring 401 on frame 3. The upward force 208 will remain (substantially) equal to the downward force 202 when the distance between the connection unit 22 and carrying unit 32 changes. With reference to FIG. 3, FIGS. 4 and 4b show the working of the spring force balancing arrangement. In FIG. 4 the distance between the connection unit 22 and carrying unit 32 is increased compared to FIG. 3, the extension of the springs is smaller and therefore the spring force is smaller but due to the leverage unit, embodied by the arm assemblies 6,7, the upward force 201 will remain (substantially) equal to downward force 202.

In FIG. 4b the distance between the connection unit 22 and carrying unit 32 is decreased compared to FIG. 3, the extension of the springs 401 is longer and therefore the spring force is larger but due to the leverage unit, the arm assemblies, the upward force 201 will remain (substantially) equal to downward force 202. The increasing/decreasing spring force as a result of the extension is leveraged by the leveraging unit in such a way that its vertical component 208, acting on frame 3, remains equal to the load force acting on frame 3 over a range of distances between connection unit 22 and carrying unit 32. When the ship is heaving (or pitching or rolling) the vertical position of the connection unit 22 changes, but since force 202 and force 201 are equal, due the inertia of the load (and in some cases action of the actuator 5), the movement of the connection unit 22 is substantially decoupled from the load. The vertical position of the load will remain substantially constant helped by the inertia of the load, and instead, the distance between connection unit 22 and carrying unit 32 will change.

In FIG. 6d, another example of an arrangement of a pneumatic spring 4 between first frame 2 and the arms of the transmission is shown. A gas supply 48 is provided on the heave balancing device 1 for each spring 4. Here the springs 4 are pivotably connected to the first frame at a sideward distance 49. This brings the springs 4 more in line with the direction of movement of pivot point 41, thereby allowing the springs 4 to be configured smaller.

In FIGS. 5 and 6a, embodiments of the device are shown, wherein the transmission comprises arm assemblies. The first and second frame are connected via two (parallel) double armed configuration. This is a rhombus configuration of pivoting arms. The (hydro) pneumatic spring 4, arranged to supply most or all of the heave balancing force, is connected between the arms of the transmission, at the force guiding and pivoting points on the arms.

In FIG. 5 the spring is an extension spring, in FIG. 6a the same function is provided by a compression spring, configured as an extension spring. In FIG. 5 the force of the gas is exerted on the rod side of the cylinder, in FIG. 5 the force of the gas is exerted on the bottom or piston side of the cylinder. However, the working principle of the spring in both FIGS. 5 and 6a is generally equal. In both FIGS. 5 and 6a the force of the spring increases when the distance between the connection unit and the carrying unit decreases and vice versa, but due to the leveraging unit, the rhombus configuration of pivoting arms, the upward force 208 exerted on frame 3 by the spring through the leveraging unit, remains equal to downward force 202, over a range of distances between connection unit 22 and carrying unit 32.

In FIGS. 5 and 6a, the (hydro-)pneumatic spring 4 is connected to the pivoting points 41 of the two parallel arm assemblies.

In FIGS. 1, 3, 4 and 4b an actuator 5 is provided between first frame 2 and second frame 3. The actuator can have many different embodiments. In the FIGS. 1, 3, 4 and 4b the actuator is shown as a linear actuator. It can be a linear motor engaging a geared teeth. Preferably, the actuator 5 can exert force on the system to over- or under-balance it, resulting in movement. The actuator 5 can be set before the operation and kept in the same position throughout, or more preferably, monitored and readjusted throughout.

It will be clear that any masses (inter alia, also masses of the apparatus components itself) that exert a torque can be taken into account and can be balanced. For further simplicity friction is ignored, although it will be clear that in case of a large friction, the balance point of the torque system is not a point, but a level. Further for simplicity the adiabatic coefficient of a gas or hydro-pneumatic spring is ignored, although it will be clear that temperature effects are relevant in practice.

In general, a load balancing system comprises a spring-balanced system having a spring-balanced configuration. Various non-limiting examples of such a system are shown, but other variations could be used.

In the preferred embodiment, the transmission couples the first and second frame via arms outside the guideline between load connection point and hoist connection point. This allows for the system to be compact, resulting in a system that can be hung under existing hoisting cranes.

In the embodiment shown in FIG. 3, a load 8 provides a net load force 202 in the Z-direction. In this embodiment virtual construction line 201 also extends in the Z-direction. Balancer arm 6 provides an upward force at point 31. This will keep second frame 3 and load 8 in the balanced position. The net load force results in a downwards force on arm part 7 at the force guiding point and pivoting point 41, resulting in a clockwise (CW) torque around pivoting point 21. Thereby second frame 3 supplies (indirectly) a pulling force on first frame 2, resulting in a pulling force 208 along virtual construction line 205 applied at pivoting point 21. This force 208 results in an upwards force component on arm 6 at the force guiding point and pivoting point 41, resulting in counterclockwise (CCW) torque around pivoting point 31.

The torque in pivot point 21 is dependent on the force exerted on the arm 7, the length of the arm (distance between the force application point, here 41 and the pivot point 21), and the angle between the virtual construction lines 204 and 201. Similarly, the torque in 31 is dependent on the angle between virtual construction lines 201 and 203.

(Hydro) pneumatic spring 4 provides counter-torque around pivot points 21 and 31 by providing a pulling force 207 along virtual construction line 206. This pulling force 206 exerted on arm 6 at the force guiding point and spring force application point 41, results in CW torque around pivot point 31. Pulling force 206 exerted on arm 7 at point 41 results also in CCW torque around pivot point 21.

In embodiments the transmission and/or the spring force balancing arrangement comprises at least a first force application point 21 that is directly suspended to the connection unit 22 and a second force application force 31, which directly suspends the carrying unit 32, wherein the first force application point is positionally closer to the carrying unit than the second force application point. In operation such an arrangement provides for a compact arrangement. In embodiments a third force application point 41, preferably providing a partial suspension force to the carrying unit that is positioned radially outward from the guideline 209

In a balanced system, the torque due to net load weight 202 and pulling force 208 due to drive element 3, is partially or fully balanced torque due to spring force 207, with any resting force/torque imbalance negated by actuator 5. This results in no net movement of the first frame 2 with respect to second frame 3. In operation the first frame 2 can move with respect to second frame 3 without changing this balance, thereby providing a spring balanced system.

When perturbations in the z-direction occur, for example due to heaving motions of vessel 11, the position of first frame 2 is moved as a result of movement of drive element 9. When this occurs, the balanced system will allow first frame 2 to move along the linear guideline 209 with respect to second frame 3 and due to the inertia of load 8 first frame 2 will move with respect to second frame 3, keeping the load 8 in position. Movement of the spring system 4 will keep the system in balance. It has been found that rather than having only one truly balanced (stabilized) position, the invention shows a substantially balanced system along the entire range of motion of the spring and system. In embodiments the spring system 4 allows an approximation of balance. In that embodiment the balance is achieved by action of the actuator 6. The actuator 6 can be configured to provide a force or torque in order to operate the system as a balanced system.

FIGS. 4 and 4b show examples of positions of the heave balancing device 1 in positions different from the position in FIG. 3. The second frame 3 has moved with respect to first frame 2, resulting in the heave balancing device having a different length. In FIG. 4a, a heave movement of the vessel 11 has in the crane tip moving upward, that movement being compensated for by extending the length of the heave balancing device 1 as a result of the mechanical transmission in combination with the (hydro) pneumatic spring. This then results in an upwards net movement by second frame 3 with respect to frame or support 2. In FIG. 4b, the motion of the ship resulted in the crane tip moving upward with respect to the 'starting position' shown in FIG. 3.

In embodiments of the invention the balance heave devices are balanced or approximately a balanced system. In embodiments, the force supplied by spring system 4 is dependent on the area of triangle of the engagement points 21, 41, 42 and the configuration of the spring system 4. The torques supplied by net load force 202 and pulling force 208 are dependent on the angle of the arms.

In FIG. 4 for example, the heave balancing device 1 moved its arms assembly, in order to increase the length of the heave balancing device 1. As a result, the arms 6,7 moved, thereby changing the angle of the force exerted by the (hydro) pneumatic spring around with respect to the arms, which results in the torque around pivoting points 31 and 21 increasing. However, the force 207 supplied by spring 4 is also smaller, as the spring 4 is more contracted in comparison to FIG. 3. This allows an overall balanced system or an approximation of a balanced system.

Similarly, in the position of FIG. 4b with respect to the 'starting position' of FIG. 3, the arms 6,7 move around pivot point 31, thereby reducing the torque around pivot point 21. However, as the spring 4 is more elongated, the pulling force 207 supplied by the spring 4 is also larger. This allows an overall balanced system or an approximation of a balanced system.

In the preferred embodiment, the spring characteristic of (hydro) pneumatic spring 4 can be varied, resulting in an over- or under-balanced system, with a slow movement of the load 8 as a result. This can be beneficial for placing or picking up load 8.

In embodiments the position of the pivot points with respect to the first frame 2 or the position of second frame 3 can be moved.

As the system is substantially balanced across the entire range of motion of arms 6,7 and spring 4, it has been found that near the limits of the range of motion of the (hydro) pneumatic spring 4, the (hydro) pneumatic spring 4 can be overexerted, with massive impact forces as a result. To prevent this, the system 1 must be limited in motion. Hence, a safeguarding system is required to be put into place.

In embodiments of the invention, the heave balancing device 1 has a safeguarding system. The safeguarding system is arranged to prevent the heave balancing device from moving toward an end position. By preventing the heave balancing device from reaching an end position, damage is prevented.

The security device can have many different embodiments and can comprise several units. In an embodiment the security system comprises a biased unit that biases the heave balancing system to a default position, e.g. a middle position of the second frame 3 with respect to first frame 2. In this application an 'end position' can be an extreme position of the arm assembly of the heave balancing device 1 in which further movement is prevented. E.g. the angle between each of the arms 6,7 and the frame can vary only between 5 and 85 degrees, or 15 and 75 degrees. Those angles form extreme positions. However, in embodiments the extreme positions are at smaller angles or a smaller range between the angles at the extreme positions.

Embodiments of the security system include, but are not limited to: a second hydro(pneumatic) spring, a damper, a (monitor and control) for the throttle valve of the (hydro) pneumatic spring 4, an actuator between load 8 and suspension point of support or first frame 2, programming the balancer 1, a connection between load 8 and target object (if present), or any combination of these. Preferably, the security mechanism both monitors the extension of the spring and/or balancer, and controls and exerts a force upon the system.

In an embodiment the security system comprises an actuator 5. In an embodiment such as FIG. 3, actuator 5 is a linear actuator and is arranged to provide a balancing force to compensate for non-linear properties of the (hydro) pneumatic spring system 4 and is arranged to also provide a return force towards a default position of the of heave balancing device 1. That return force can increase with distance of the second frame 3 from its default position.

In embodiments the security system can be a second winch and drive element in a split hoist configuration (e.g. the actuator 5 is placed on board of the floating object), for example shown in FIG. 1a. The transmission, the first and/or second frame will be able to move within a domain, with boundaries formed by the extreme positions at the end of a movement stroke of the frames. E.g. the stroke of the spring is limited. The security system prevents the balance heaving system 1 to approach these extreme positions/boundaries.

When the linear actuator 5 operates as a security system, the actuator 5 allows for some linear motion of first frame 2 with respect to second frame 3, but prevents movement outside the range of motion of the balancing system. The heave balancing device 1 can comprises a sensor that measures the respective position of the first frame 2 and second frame 3. On the basis of the measured distance by the sensor a suitable processor can compute a force to be exerted on the system for safeguarding the system, which force can be additional to the balancing force.

Preferably, the security system is arranged to prevent sudden movements.

In the embodiment shown in FIGS. 3, 4a and 4b, a linear actuator 5 is employed. In the scenario of FIG. 3, where the balancer is well within range of motion of the spring, the actuator shall only have to exert force if there is an imbalance within the system, to prevent movement. In scenarios 4a and 4b, where the systems are balanced but the systems are also near the limits of the range of operation for the spring, the actuator will be exerting a force such that the system carefully and smoothly obtains a configuration nearer the middle of the range of operation, such as shown FIG. 3. Since the heave balancing device substantially balances the load over a range of distances between the connection unit 22 and the carrying unit 32, the force of the actuator required to function as a security system can be very small.

In FIG. 6b, another embodiment according to the invention is shown. The (hydro) pneumatic spring 4 is connected on the rhombus configured arms 6,7 of the transmission at a distance 71 and 72 respectively from the pivoting points 41. As in previous examples, the (hydro) pneumatic spring 4 is arranged as a pulling device, and the force provide by said spring is guided through the force guiding points. The non-linear behavior of a gas spring can be (partly) counteracted by choosing an optimal position of the connection points of the spring. This leads to a better balance and therefore to a better decoupling.

FIG. 6c shows another embodiment according to the current invention. FIG. 6c is an example of an embodiment wherein the leverage unit is formed by the two pivoting pneumatic springs itself, the leverage being provided dependent on the angle α.

FIG. 6d shows another embodiment according to the current invention. FIG. 6d is an example of an embodiment engaging compression springs instead of extension springs.

In this example, the configurable pneumatic two springs 4 connect to first frame 2 and second frame 3. The pneumatic springs 4 are connected via pivoting points 601 and 602, and form the pivoting arms of the device. By changing the length of the springs and the angle α between springs and frames, first frame 2 and second frame 3 are allowed to move with respect to each other. In the shown embodiment, the angle α is, in this example, about 45 degrees. When the distance between de connection unit and the carrying unit decreases, the compression spring is further compressed and its force therefore increases but since angle alpha α also increases an increasing part of the spring force is deflected in a horizontal direction, rendering the upward force of the spring in point 602 generally equal. This works only when angle α remains larger than 5 degrees and smaller than 85 degrees. In this embodiment the area of triangle between points 602 and 601 is (inversely) correlated to the spring force in such a way the upward component of the spring force remains generally equal to the downward force of the load over a range of movement of frame 2 relative to frame 3.

This embodiment can also be executed with one spring or more than 2 springs, as is the case with most embodiments shown in other figures. When this embodiment is executed with three or more springs the point where the three springs come together can be the carrying unit, the load can be connected directly to this point and a second frame is not required.

In FIG. 6e, another embodiment according to the current invention is shown. The transmission comprises a rotating unit in the form of a pulley 81 that has a variable pitch 82. The rotating unit forms the leverage unit. The carrying unit 32 for the load is formed by a line connected to the pulley 81 of the transmission. The (hydro) pneumatic spring 4 is arranged to balance the movement in the z-direction. The first frame 83 has a pivot point 84 to which the spring 4 is connected. Spring 4 is further connected to the pulley via a wire 85 that can be wired on to the pulley at a first pitch. This will rotate the pulley. The carrying unit will however move at a leveraged amount due to the variable pitch 82. This will allow to compensate for the behavior of the spring 4, thereby providing a carrying force to the load that is close to constant, when the load moves in the z-direction.

In this embodiment, a clockwise rotation results in extension of the pneumatic spring, and a corresponding torque increase. The same rotation also corresponds in the load carrying line being wound off, resulting in an increased pitch, i.e. moment arm, with a corresponding torque increase. The variable pitch thread is arranged in such a way that a torque increase/decrease due to spring extension/compression, is (substantially) balanced by a corresponding torque increase/decrease due to the change in pitch of the load carrying line. Many other embodiments are possible.

The invention claimed is:

1. A balancing device for balancing a load, comprising:
   a first frame and a second frame;
   a connection unit that can be supported;
   a moveable carrying unit for carrying a load; and
   a transmission that couples the connection unit and carrying unit, wherein said transmission is arranged to guide the connection unit and the carrying unit to move along a guideline with respect to each other, the transmission having a spring force balancing arrangement with one or more leverage units, and with at least one configurable gas- or hydr-pneumatic spring,
   wherein the transmission further comprises an actuator, arranged to provide a compensating force to compensate for spring balance deviations as a result of non-perfect gas- or hydro-pneumatic spring behavior, and to drive the transmission and thereby adjust the distance between the connection unit and the carrying unit by over-balancing or under-balancing the spring force balancing arrangement, and
   wherein the second frame connects the carrying unit to the transmission, and the transmission comprises at least two pivoting arms that have pivoting points.

2. A device according to claim 1, wherein each gas- or hydro-pneumatic spring is arranged to apply force at two application points, each located on either the first frame or one of the leverage units, and each gas- or hydro-pneumatic spring pivots with respect to the guideline around at least one of said points of application during:
   extension or contraction of the gas- or hydro-pneumatic spring in question, and/or
   movement of one of the leverage units relative to the gas- or hydro-pneumatic spring in question, connection unit and/or carrying unit, and/or
   movement of the connection unit relative to the carrying unit.

3. A device according to claim 1, wherein each gas- or hydro-pneumatic spring is configured to apply force at two application points, each located on either the first frame or one of the leverage units, such that said two application points and a third point on the first frame define a triangular area, correlated with extension or compression of the gas- or hydro-pneumatic spring in question for balancing the load.

4. A device according to claim 1, wherein
   the transmission comprises a linear guide for guiding the first frame with respect to the second frame.

5. A device according to claim 4, wherein:
   the transmission comprises the at least one configurable gas- or hydro-pneumatic spring and at least one other configurable gas- or hydro-pneumatic spring, wherein each of the springs is connected via one of the pivoting points to the first or the second frame and to one of the pivoting points on one of the pivoting arms of the transmission.

6. A device according to claim 1, wherein
each configurable gas- or hydro-pneumatic spring is positioned not-in-line with the guideline; and/or
each configurable gas- or hydro-pneumatic spring pivotably connects the first and second frames, and/or
each configurable gas- or hydro-pneumatic spring is positioned between one of the frames and the pivoting arm; and/or
each configurable gas- or hydro-pneumatic spring is positioned on different arms of the transmission.

7. A device according to claim 1, wherein at least one of the leverage units is arranged to, at different extension of each gas- or hydro-pneumatic spring, convert the spring force onto the load with different multipliers, and wherein the at least one leverage unit comprises:
a rotating element having a thread with a variable pitch; and/or
each gas- or hydro-pneumatic spring pivotably arranged between the first and second frames.

8. A device according to claim 7, wherein at least one of the leverage units comprises a rotating element having a thread with a variable pitch, wherein each gas- or hydro-pneumatic spring is connected to the rotating element and is also connected to the first or second frame.

9. A device according to claim 1, wherein the transmission allows at least one of the first and second frames to move in a domain, the domain having a first boundary and a second boundary, wherein the transmission further has security arrangement that is arranged to bias the transmission from not reaching the first and/or second boundary.

10. A device according to claim 9, wherein
the first, second or both boundaries are extremities of the movement by the transmission; and/or
the security arrangement comprises a toothed track on one of the frames; and/or
the security arrangement comprises a unit for controlling the at least one configurable gas- or hydro-pneumatic spring; and/or
the security arrangement is arranged to increase the return force when the transmission has moved at least 50% from a default or middle position toward one of the boundary positions.

11. A device according to claim 1, wherein:
the actuator is connected to at least one of the leverage units; and/or
the actuator is connected to one of the first and second frames; and/or
the actuator is arranged to act on the cylinder of each gas- or hydro-pneumatic spring in the opposite direction of the force of the gas of the gas- or hydro-pneumatic spring in question; and/or
the actuator is driven by a control system which receives signals from a motion reference unit; and/or
the actuator is a throttle valve of the at least one gas- or hydro-pneumatic spring, controlling the flow of the oil between the piston of the cylinder and the gas volume and/or the flow of the gas.

12. A method for carrying a load using the balancing device according to claim 1, the method comprising:
connecting the connecting unit of the balancing device to a hoisting line of a hoisting device;
carrying the load by connecting the load to the carrying unit of the balancing device; and
configuring the at least one gas- or hydro-pneumatic spring to the load.

13. A hoisting device for balancing a load lifted comprising:
a hoisting line connected to the hoisting device;
a connection unit suspended to the hoisting line;
a transmission coupled to the connection unit, the transmission having a spring force balancing arrangement with one or more pivoting arms and with at least one configurable gas- or hydro-pneumatic spring,
a load carrying unit connected to the transmission via a frame, which can carry or support the load,
wherein the transmission further has an actuator, arranged to provide a compensating force to compensate for spring balance deviations as a result of non-perfect gas- or hydro-pneumatic spring behavior, and to drive the transmission and thereby the distance between the connection unit and the carrying unit by over-balancing or under-balancing the spring force balancing arrangement, and
wherein the transmission comprises at least two pivoting arms that have pivoting points.

14. A hoisting device according to claim 13, wherein the actuator is coupled to the transmission.

15. Method for carrying a load by a hoisting device by hoisting the load via a transmission that has a pivoting arm and at least one configurable gas- or hydro-pneumatic spring,
wherein the transmission further has an actuator and at least two pivoting arms that have pivoting points, the method further comprising:
providing a compensating force, using the actuator, to compensate for spring balance deviations as a result of non-perfect gas- or hydro-pneumatic spring behavior;
providing a connection unit coupled to a moveable carrying unit by the transmission; and
driving, using the actuator, the transmission and thereby the distance between the connection unit and the carrying unit by over-balancing or under-balancing a spring force balancing arrangement comprising the at least one configurable gas- or hydro-pneumatic spring.

16. Method according to claim 15, further comprising, dependent on the load and/or dependent on the non-linear behavior of the at least one gas- or hydro-pneumatic spring in operation and/or to secure safe operation of the hoisting device:
configuring the at least one gas- or hydro-pneumatic spring to the load; and/or
positioning of one or more of the pivoting points in the transmission; and/or
extending the at least two pivoting arms of the transmission; and/or
actuating the actuator.

* * * * *